United States Patent [19]
MacDonald et al.

[11] Patent Number: 5,875,493
[45] Date of Patent: Mar. 2, 1999

[54] MODULAR HEAD COVERING SYSTEM

[76] Inventors: Alexandra MacDonald, P.O. Box 2142; Lisa Grace, P.O. Box 2187, both of Sisters, Oreg. 97759

[21] Appl. No.: 752,355

[22] Filed: Nov. 19, 1996

[51] Int. Cl.[6] .................................................. A42B 1/06
[52] U.S. Cl. ..................... 2/172; 2/10; 2/171.1; 2/181; 2/195.1
[58] Field of Search ................. 2/172, 195.1, 171.1, 2/10, 181, 202, 203

[56] References Cited

U.S. PATENT DOCUMENTS

| | | | |
|---|---|---|---|
| 1,481,541 | 1/1924 | Douglas | 2/116 |
| 2,844,822 | 7/1958 | Persico et al. | 2/172 |
| 2,859,448 | 11/1958 | Gaichel | 2/199 |
| 3,480,970 | 12/1969 | Gettlinger | 2/207 |
| 3,671,977 | 6/1972 | Degnon | 2/207 |
| 4,023,212 | 5/1977 | Huffman | 2/197 |
| 4,277,847 | 7/1981 | Florio | 2/12 |
| 4,395,781 | 8/1983 | Myers | 2/4 |
| 4,630,317 | 12/1986 | Brown et al. | 2/12 |
| 4,821,341 | 4/1989 | Baptiste | 2/202 |
| 4,887,317 | 12/1989 | Phillips et al. | 2/243 |
| 4,980,928 | 1/1991 | Ellis | 2/88 |
| 5,048,128 | 9/1991 | Watson | 2/204 |
| 5,070,545 | 12/1991 | Tapia | 2/195 |
| 5,083,317 | 1/1992 | DeMorets | 2/174 |
| 5,091,995 | 3/1992 | Oates | 2/195 |
| 5,099,524 | 3/1992 | Linday | 2/181 |
| 5,212,837 | 5/1993 | Gose et al. | 2/172 |
| 5,293,646 | 3/1994 | Winston | 2/88 |
| 5,323,491 | 6/1994 | Barrett | 2/207 |

OTHER PUBLICATIONS

Advertisement: Bula (R) Outdoor, *Outfitter Magazine* Nov., 1995, p. 23, "White Water Natural Nylon Cap".
*The Boundary Water Catalog: Canoeing and Camping Edition*, 1995 p. 6. "Save–Your–Skin Hat".
*Travel Smith Outfitting Guide and Catalog,* Holiday 1995, p. 27, Sequel, "Desert Cap".
*Sun Precautions* catalog, 1996, p. 17, "adult shade cap".

*Primary Examiner*—Diana L. Biefeld

[57] ABSTRACT

The Modular Head Covering System includes a temperature regulation module, an insect-excluding module and a rain cover module. The temperature regulation module can include the following components: a head-encircling member such as a headband, to which a visor, a scarf-like headcover, and a pair of side flaps can be detachably attached in varying combinations for shade, regulation of body heat, and insulation. The headcover attaches within a pocket built into the section of the head-encircling member that crosses the forehead of the wearer. Two notches are cut into the headcover, one on each side, where the pocket ends at approximately the temples of the wearer. Notches allow the attaching edge of the headcover to be fastened within the pocket, and the rest of the headcover to be positioned either over (on the outside of) the head-encircling member or under (on the inside of) the head-encircling member. The side flaps also fasten within pockets built into the head-encircling member, one on each side. They can open, close, and overlap in the back, and move forward and backward. The insect cover module is designed to provide an insect-proof environment for the head, neck, and upper torso and to function comfortably when worn with a backpack-like device. The rain cover module is designed to prevent precipitation from contacting the head, neck, and shoulders of the wearer and to present no seams to direct precipitation. The insect cover module and the rain cover module can be used in conjunction with the temperature regulation module as weather and environmental conditions require.

9 Claims, 20 Drawing Sheets

FIG. 2

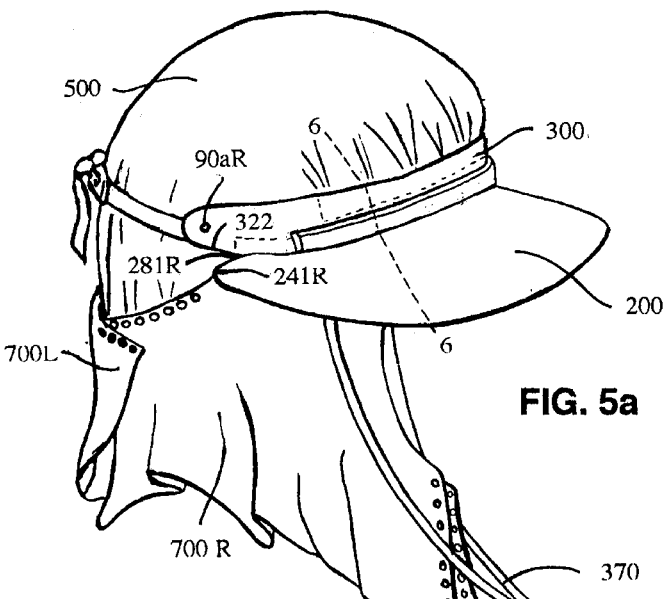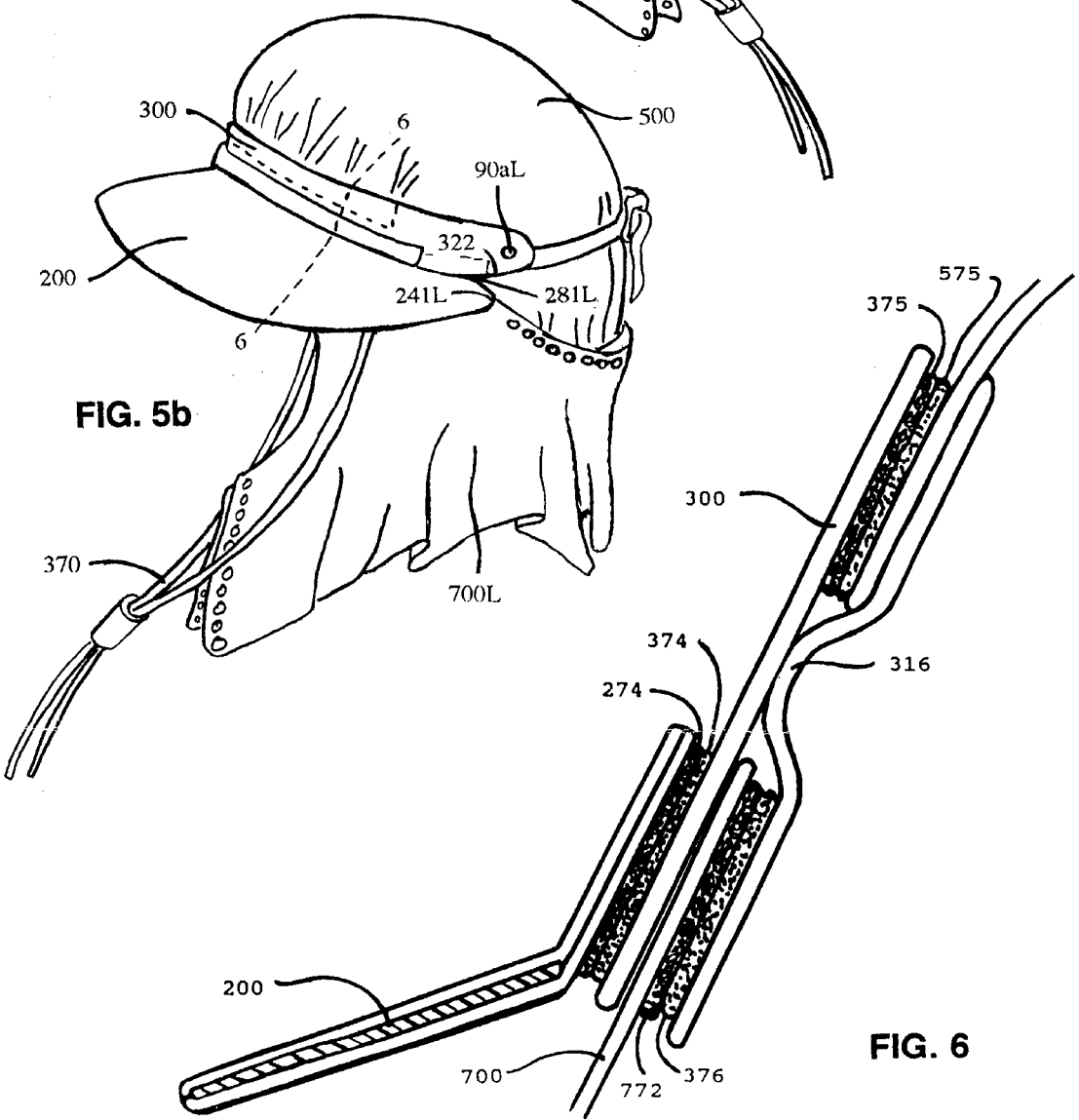

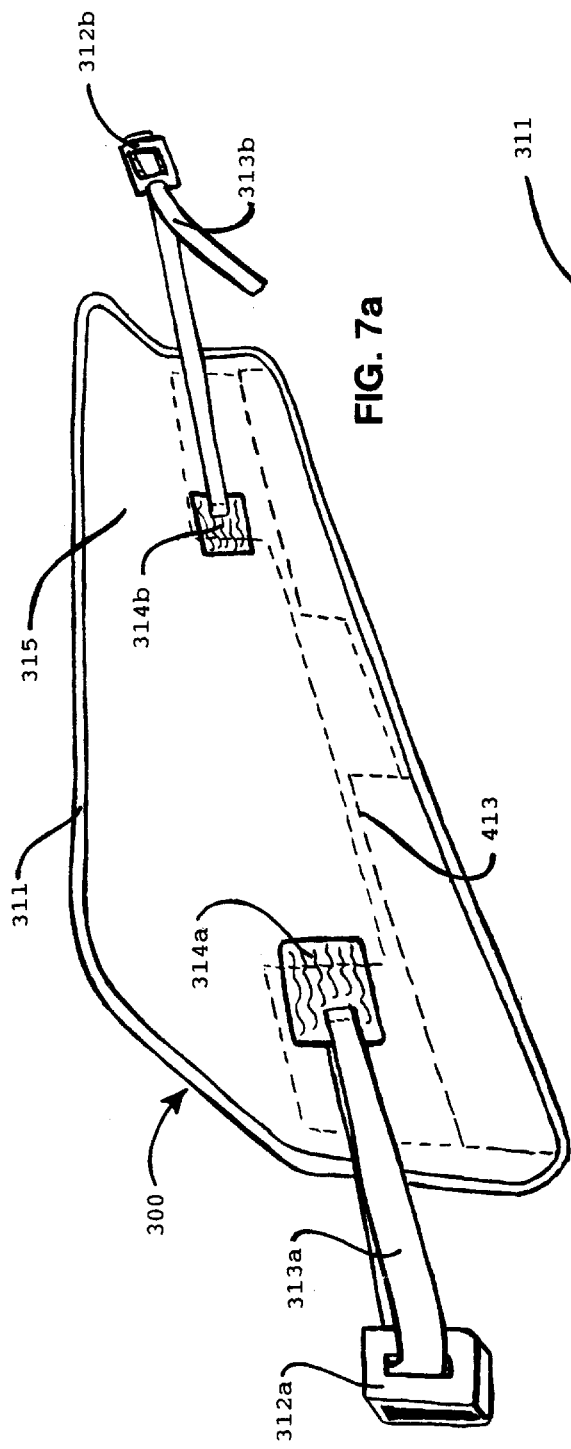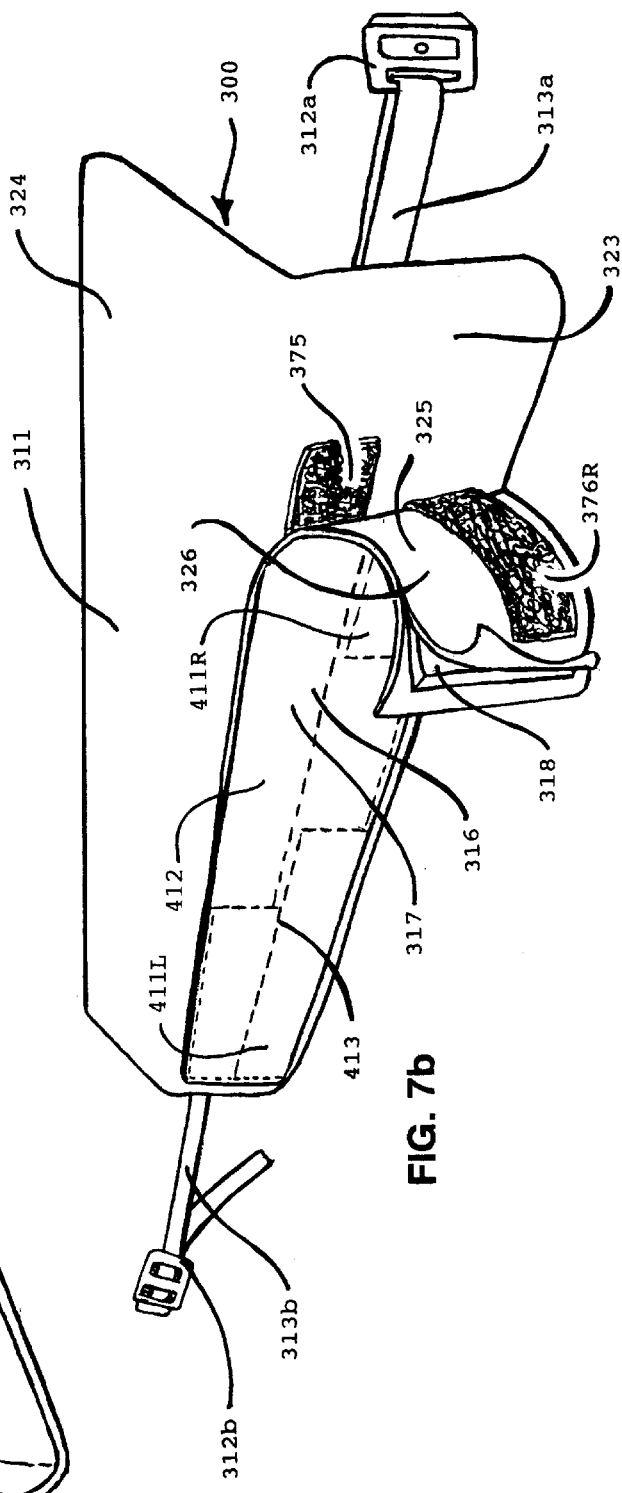
FIG. 7a
FIG. 7b

MODULAR HEAD COVERING SYSTEM

BACKGROUND-FIELD OF INVENTION

This invention pertains to a modular system of head coverings. More particularly, the invention pertains to a light-weight, easy to pack grouping of components that work together in combinations to provide protection to a person's head, neck, and throat from the damaging effects of exposure to sun, wind, dust, heat, cold, insects, and precipitation.

BACKGROUND-DESCRIPTION OF THE PRIOR ART

The prior art shows many head coverings. Most are designed for a single kind of use. Consequently, a person who wears hats needs many of them in order to be prepared for all eventualities. This is particularly true for people who work or recreate in the out-of-doors.

A modular or combination all-in-one head covering system was not discovered in the prior art. Also, in the field of outdoor recreation, the manufacturers have not produced an all-inclusive system. The use of a plurality of hats, each for a different condition, is ineffective and impractical for weight-conscious backpackers and travelers. In addition, people are becoming more environmentally conscious and concerned about the health impacts of sun exposure, insect bites, and heat and cold related illness.

The prior art discloses numerous head coverings that provide shade. However, not one has succeeded in providing sun protection to all areas of the head, neck, throat, and face regardless of the angle of the sun. Given the deleterious effects of sun exposure, a head covering is needed that conveniently offers a variety of options in response to differing qualities and angles of sunshine.

People who work or recreate outdoors encounter a variety of ever-changing environmental circumstances. These people need a comprehensive easy-to-use system for protection of the head, neck, and throat. Such a system has not yet been developed. The present invention seeks to address these and other deficiencies.

The most common sort of head covering is the baseball cap. These hats shade the eyes and offer limited protection for the rest of the face depending on the angle of the sun. Baseball caps have a fixed crown depth even if the cap's head-encircling member is adjustable. Some baseball caps have crown coverings which are separable or convertible. However, the beneficial effects of this versatility are limited to the top of the wearer's head.

Head coverings of the scarf or veil type with an attached visor provide some shade and insulation to the head and back of the neck. However, to secure them, the wearer must tie them to his or her head using strings attached on or near the visor or the corners of the scarf itself. This pulls back and flattens the visor and scarf leaving the sides of the face and neck exposed. A sun and wind protective scarf or veil detachable from an independently functional head-encircling member and visor was not found in a search of the prior art. A scarf-like head cover combined with a double flapped component was also not found in the prior art.

Caps with flaps, detachable or permanently attached, are known in the prior art. However, prior art shows no examples of side flaps which can be moved forward or backward to create more or less shade on the face and to offer protection to the nose and mouth. Also, all side flaps found in the prior art were either of one-piece construction or too small to create adequate shade except directly on the ears.

Also not found in the prior art are side flaps or scarf-like head coverings designed to function co-operatively with other components and modules in a comprehensive head covering system.

In the prior art of head garments for protection from biting insects, we find hooded garments, head nets, or hats with devices to keep the fabric up or off the skin. The hooded garments necessitate wearing the entire garment to protect the head if the hood is not detachable. Those that classify as head nets do not provide for easy access to the wearer's face unless one removes the entire head covering. Also, prior art does not disclose an insect-excluding head covering designed to provide the wearer with some control over ventilation or heat retention. Prior art also does not disclose an insect-excluding garment for the head and upper torso that is effective when worn with a backpack-like carrying device.

Further, the prior art does not disclose an insect-excluding head covering that is designed to function co-operatively with other modules in a comprehensive head covering system.

The prior art is replete with garments to protect the head from precipitation. Most common are hoods. Hoods drain water onto the shoulders of the user's coat. Eventually, water can saturate the fabric creating leaks, especially if any seams are exposed. Hoods are usually attached to coats which limits their mobility. This is because a hood stays in one position even if the head is rotated. Turning one's face to the side while wearing a hood can cause the sides of the face and the hair to get wet, a condition that is not only uncomfortable, but may contribute to hypothermia.

In the art of rain hats, most common is the wide-brimmed waterproof version of a cowboy-style hat. If the brim is not wide enough, these hats tend to drain water right down the back of the wearer's neck. If the brim is wide enough, it presents a different set of problems. Wide-brimmed hats must be removed to comfortably sit where space is limited behind the head, such as in a car or truck seat or when a backpack is worn.

Other attempts at waterproof head coverings include the umbrella-like modification of a hat or cape. These require additional parts or contraptions that make them cumbersome or impractical for the traveler or adventurer. Also, hooded cape-like rain gear is not practical for a person wearing a backpack.

Technological advances in the textile industry have produced many waterproof fabrics. Unfortunately, wherever a needle penetrates the fabric the waterproof properties are compromised and, if the seams will be exposed to direct precipitation they require sealing. The sealing process can be done by hand, which is inexpensive but time consuming, or by a seam sealing mechanism. Even sealed seams can eventually be compromised. A search of the prior art revealed no rain protective garments constructed so that no seams are presented to direct precipitation.

Finally, the prior art does not disclose a waterproof garment designed to function with other modules in a comprehensive head covering system.

Note to the Reader

This invention comprises three modules, one of which comprises four components. We have chosen, for the sake of clarity, to refer to these parts in the following way:

a) the word "module" refers to one of the three basic units that comprise the Modular Head Covering System: the temperature regulation module, the insect cover module, and the rain cover module, and b) the word "component" refers to one of the four basic units that comprise the temperature regulation module: the visor, the headband, the headcover, and the side flaps.

OBJECTS AND ADVANTAGES

The main object of the invention is to provide a head covering system made up of lightweight, easy to pack and carry, and functionally compatible head covering modules and components.

Another object of the invention is to present modules and components that are variously and easily combined.

Another object of the Modular Head Covering System is to provide comfort and protection to the wearer in a wide range of weather and environmental conditions including heat, cold, wind, rain, dust, snow, direct sun from any angle, and insect infestation. The Modular Head Covering System is designed to meet the special conditions encountered while hiking, camping, mountaineering, climbing, horseback riding, hunting, fishing, traveling, gardening, or survival activities.

Another object of the invention is to provide the wearer with a reduced risk from environmental hazards such as hypothermia, hyperthermia, sunburn, dust inhalation, insect poisoning and bite discomfort, and excessive ultraviolet radiation exposure which can contribute to skin cancer.

Another object of the Modular Head Covering System is to provide the wearer with a temperature regulation module, an insect cover module, and a rain cover module.

Temperature Regulation Module

The temperature regulation module is designed to create shade on the face, head, neck, and throat regardless of the angle of the sun, and to offer protection from dust, heat, and cold.

One object of the temperature regulation module is to provide the following components: a visor, a head-encircling member or headband, a headcover, and a pair of side flaps. Further, these components are to function co-operatively with one another to create, as needed, shade, ventilation, and/or insulation. An advantage of the present invention is that the method of securing the temperature regulation module to the head does not decrease its shade-producing capabilities.

Another object of the temperature regulation module is to provide a versatile scarf-like headcover that can be comfortably worn under the headband to retain body heat, or over the headband to provide shade while allowing excess body heat to dissipate.

Another object of the temperature regulation module is to provide a headcover that, when worn under the headband, creates a covering over the crown of the head. This covering can be as deep or shallow as needed depending upon the size of the wearer's head or how the wearer has positioned the headband.

One function of the temperature regulation module is to provide a headcover with a closure device of unique configuration that allows the wearer to arrange and secure the headcover in varying ways in order to keep the face and throat in shade.

One object of the temperature regulation module is to provide side flaps which can be wrapped around the head for warmth or over the nose and mouth for protection from dust. Side flaps can also be placed further back on the head, or further forward. They can be worn under helmets such as those worn by kayakers, bikers, riders, and climbers.

One object of the temperature regulation module is to create layers of fabric for insulation by providing for the use of the headcover and side flaps at the same time.

One object of the temperature regulation module is to function co-operatively with the insect cover module and the rain cover module to provide protection from sun, wind, cold, or dust in conditions where there may also be insects present and/or precipitation.

Insect Cover Module

One object of the insect cover module is to protect the face, head, and upper torso of the wearer from insects. The insect cover module is not attached to any other garment. However, it is designed to function compatibly with the visor of the temperature regulation module. Extra wires and devices are not necessary to hold the insect cover module away from the face of the wearer.

Another object of the insect cover module is to provide an insect-excluding head covering that depends from the visor of the temperature regulation module creating a protected area around the face of the wearer.

Another object of the insect cover module is to allow access to the wearer's face by way of an easily opened and closed panel. If the panel is barely opened, a straw can pass through and the wearer can enjoy a hot or cold drink without exposing any protected areas. If the panel is opened all the way, it flips up above the visor so that the wearer can eat, drink, or see more clearly.

Another object of the insect cover module is to provide the wearer with a head-encircling member that can be worn over the insect cover material to create more loft or under the insect cover material to create more ventilation.

Another object of the insect cover module is to provide a comfortable provision for the shoulder straps found on backpack-like carrying devices. The insect cover module has closures along each side which can be opened to pass a strap through and then re-sealed around the strap. Thus, on the front of the wearer's body, the straps lie under the insect cover module. This provides the wearer with a greater range of motion while maintaining an insect-proof seal.

Another object of the insect cover module is to function co-operatively with the temperature regulation module and/or the rain cover module to provide protection from insects when it is also hot, cold, sunny, shady, rainy, dry, or humid.

Rain Cover Module

One object of the rain cover module is to protect the wearer from precipitation and wind. The rain cover module is not attached to any other garment, such as a coat. However, it is designed to function compatibly with the visor of the temperature regulation module. Extra wires or devices are not necessary to hold the rain cover module away from the face of the wearer.

One advantage of the rain cover module of the present invention is that it allows the wearer to look to the side without loss of visibility and without exposing the side of the face and head to precipitation.

Another object of the rain cover module is to create a rainproof head covering that exposes no seams to direct precipitation.

Another object of the rain cover module is to provide a rainproof head covering that depends from the visor of the temperature regulation module creating a sheltered area around the face of the wearer. Thus, eyeglasses are protected from precipitation.

One object of the rain cover module is to present a waterproof head covering of a tent-like shape to shunt water off the shoulders. Underarm fastening devices hold the bottom edge in place across the upper arm to maintain the tent-like shape.

Another object of the rain cover module is to provide a rainproof head covering that, while covering the head, can extend rearward and cover the top of the wearer's backpack. This protects the wearer's upper back which is difficult to keep dry when wearing a backpack in the rain.

Another object of the rain cover module is to provide a built-in storage bag which keeps the rain cover module itself neatly tucked away and also has room to contain the insect cover module and the flexible fabric parts of the temperature regulation module. The storage bag can be hung from a pack or belt using its loop and hook. The visor/headband can clip through the loop. Since the visor/headband is the most often used combination of components, it is an advantage to have it so easily accessible.

Another object of the rain cover module is to function cooperatively with the insect cover module and the temperature regulation module to provide protection from precipitation, wind or water spray when it is also hot, cold, sunny, humid, or when biting insects are present.

Still further objects and advantages will become apparent from a consideration of the ensuing description and drawings.

DRAWING FIGURES

FIG. 5a is a right side perspective view of the Temperature Regulation Module.

FIG. 5b is a left side perspective view of the Temperature Regulation Module.

FIG. 6 is a cross-sectional view of the Temperature Regulation Module as seen on the line 6—6 of FIG. 5.

FIG. 7a is a perspective view of the headband showing the front-facing surface lifted to expose the inside parts and surfaces.

FIG. 7b is a perspective view of the headband of FIG. 7a seen from the opposite side, and showing the pockets.

REFERENCE NUMERALS OVERVIEW

Figure 1:
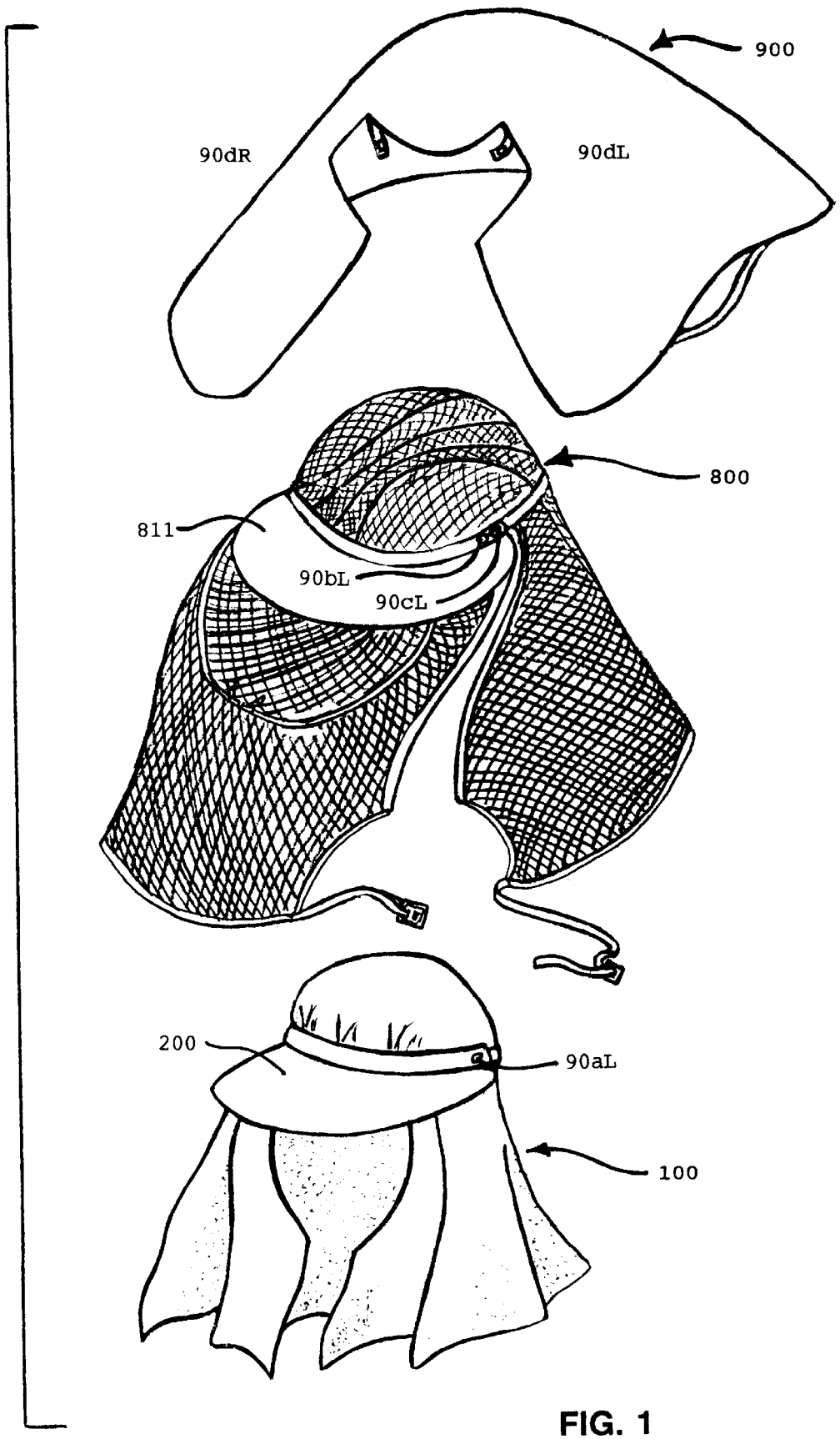
FIG. 1 is an exploded view of a Modular Head Covering System.

| 100 | TEMPERATURE REGULATION MODULE | 10 | Main parts |
|---|---|---|---|
|  |  | 20 | Edges |
| 200 | Visor | 30 | Closures |
| 300 | Headband | 40 | Points/Corners |
| 400 | Pockets | 50 | Casings |
| 500 | Headcover | 60 | Overlaps |

-continued

| | |
|---|---|
| 600 Notches | 70 Attachment Devices |
| 700 Side Flaps | 80 Junctures/Openings |
| 800 INSECT COVER MODULE | 90 All-Module Fastening Devices |
| 900 RAIN COVER MODULE | |

REFERENCE NUMERALS IN DRAWINGS

| | |
|---|---|
| TEMPERATURE REGULATION MODULE | 100 |
| Visor | 200 |
| Brim | 201 |
| Visor Underside Material Piece | 211 |
| Visor Topside Material Piece | 212 |
| Visor Stiffener | 214 |
| Outer Rim Edge | 221 |
| Inner Rim Edge | 222 |
| Rounded Terminal Points | 241R, 241L |
| Visor Zipper | 272 |
| Visor Hook and Loop Fastener | 274 |
| Juncture Clefts | 281R, 281L |
| Headband | 300 |
| Headband Material Piece | 311 |
| Headband Buckle | 312a, 312b |
| Headband Straps | 313a, 313b |
| Elastic Pieces | 314a, 314b |
| Interfacing | 315 |
| Headband Liner | 316 |
| Liner Material Piece | 317 |
| Padding | 318 |
| Headband Superior Edge | 321 |
| Headband Inferior Edge | 322 |
| Headband Interior Surface | 323 |
| Headband Exterior Surface | 324 |
| Headband Liner Interior Surface | 325 |
| Headband Liner Exterior Surface | 326 |
| Hat Retention Device | 370 |
| Hat Retention Loops | 371R, 371L |
| Headband/Visor Zipper | 372 |
| Headband/Visor Hook and Loop Fastener | 374 |
| Headband/Head Cover Fastening Device | 375 |
| Headband/Side Flaps Fastening Devices | 376R, 376L |
| Hat Retention Hooks | 377R, 377L |
| Hat Retention Straps | 378R, 378L |
| Sliding Adjuster | 379 |
| Crown Opening | 381 |
| Temperature Regulation All-Module Fastening Devices | 90aR, 90aL |
| Pockets | |
| Lower Pockets | 411R, 411L |
| Upper Pocket | 412 |
| Stitching Pattern | 413 |
| Headcover | 500 |
| Headcover Material Piece | 511 |
| Facing | 512 |
| Side Cinches | 513R, 513L |
| Side Cinch Straps | 514a, 514b |
| Side Cinch Buckle | 515 |
| Superior Convex Edge | 521 |
| Side Edges | 522R, 522L |
| Bottom Edge | 523 |
| Throat Points | 543R, 543L |
| Throat Closure Overlap | 561 |
| Throat Closure Fastening Device | 571 |
| Throat Points Fastening Devices | 573R, 573L |
| Headcover Fastening Device | 575 |
| Face Opening | 581 |
| Notches | 600R, 600L |
| Notch Superior Edge | 621 |
| Notch Inferior Edge | 622 |
| Side Flaps | 700R, 700L |
| Side Flap Superior Edges | 721R, 721L |
| Side Flap Facial Edges | 722R, 722L |
| Side Flap Throat Closure Edges | 723R, 723L |
| Side Flap Bottom Edges | 724R, 724L |
| Rear Inferior Edges | 725R, 725L |
| Rear Superior Edges | 726R, 726L |
| Rear Overlap | 761 |
| Side Flap/Headband Fastening Devices | 772R, 772L |
| Side Flap Throat Closure Fastening Devices | 773R, 773L |
| Bottom Corner Fastening Devices | 774R, 774L |
| Rear Overlap Fastening Devices | 775R, 775L |
| INSECT COVER MODULE | 800 |
| Visor Cover | 811 |
| Insect Cover Straps | 813a, 813b |
| Insect Cover Buckle | 814 |
| Face Panel | 816 |
| Front Panel | 817 |
| Rear Panel | 818 |
| Crown Panel | 819 |
| Front Bottom Edge | 822 |
| Rear Bottom Edge | 823 |
| Front Shoulder Edges | 824R, 824L |
| Rear Shoulder Edges | 825R, 825L |
| Side Closures | 831R, 831L |
| Front Bottom Casing | 854 |
| Rear Bottom Casing | 855 |
| Front Panel Fastening Devices | 871R, 871L |
| Rear Panel Fastening Devices | 872R, 872L |
| Face Panel Fastening Device | 873 |
| Front Bottom Casing Tightening Device | 874 |
| Rear Bottom Casing Tightening Device | 875 |
| Front Underarm Fastening Devices | 876R, 876L |
| Rear Underarm Fastening Devices | 877R, 877L |
| Insect Cover Junctures | 884R, 884L |
| Insect Cover Face Panel Opening | 885 |
| Insect Cover All-Module Fastening Devices | 90bR, 90bL, 90cR, 90cL |
| RAIN COVER MODULE | 900 |
| Rain Cover Material Piece | 911 |
| Rain Cover Lining | 912 |
| Storage Bag | 914 |
| Superior Edge | 920 |
| Vertical Lining Edges | 921R, 921L |
| Superior Lining Edge | 922 |
| Vertical Face Edges | 923R, 923L |
| Horizontal Face Edges | 925R, 925L |
| Vertical Neck Edges | 927R, 927L |
| Rain Cover Bottom Edge | 929 |
| Rain Cover Overlap | 965 |
| Rain Cover/Visor Attachment Devices | 972R, 972L |
| Storage Bag Zipper | 974 |
| Rain Cover Overlap Fastening Devices | 975R, 975L |
| Rain Cover Underarm Fastening Devices | 976R, 976L |
| Storage Bag Loop | 977 |
| Storage Bag Hook | 978 |
| Rain Cover Face Opening | 985 |
| Rain Cover All-Module Fastening Devices | 90dR, 90dL |
| All-Module Fastening Devices | |
| Temperature Regulation All-Module Fastening Devices | 90aR, 90aL |
| Insect Cover All-Module Fastening Devices | 90bR, 90bL, 90cR, 90cL |
| Rain Cover All-Module Fastening Devices | 90dR, 90dL |

DESCRIPTION

FIG. 1 shows the Modular Head Covering System comprising three primary modules: a temperature regulation module 100, an insect cover module 800, and a rain cover module 900.

Temperature regulation module 100 provides protection to the wearer from the sun's ultraviolet rays, wind, cold, or heat. Temperature regulation module 100 is primarily constructed of flexible material selected from woven or non-woven types of textiles. The material can be lined, coated, or laminated with ultraviolet, water, or wind blocking substances. Temperature regulation module 100 is usable with insect cover module 800 and/or rain cover module 900.

Insect cover module 800 protects the wearer's head, neck, throat, and upper torso from insects. Insect cover module 800 is made of a light-weight flexible material that is breathable and impenetrable by insects such as horse flies, black flies, no-see-ums, mosquitos, and others. Insect cover module 800 can be used in conjunction with temperature regulation module 100 and/or rain cover module 900.

Rain cover module 900 is designed to shield the head and neck of the wearer from rain, sleet, snow, wind, and water spray. Rain cover module 900 is made of flexible, waterproof material of woven or non-woven textiles, lined or unlined, including those with coatings or laminations. Rain cover module 900 can be used with temperature regulation module 100 and/or with insect cover module 800.

The following is a detailed structural description of each module and component.

TEMPERATURE REGULATION MODULE

Figure 2:
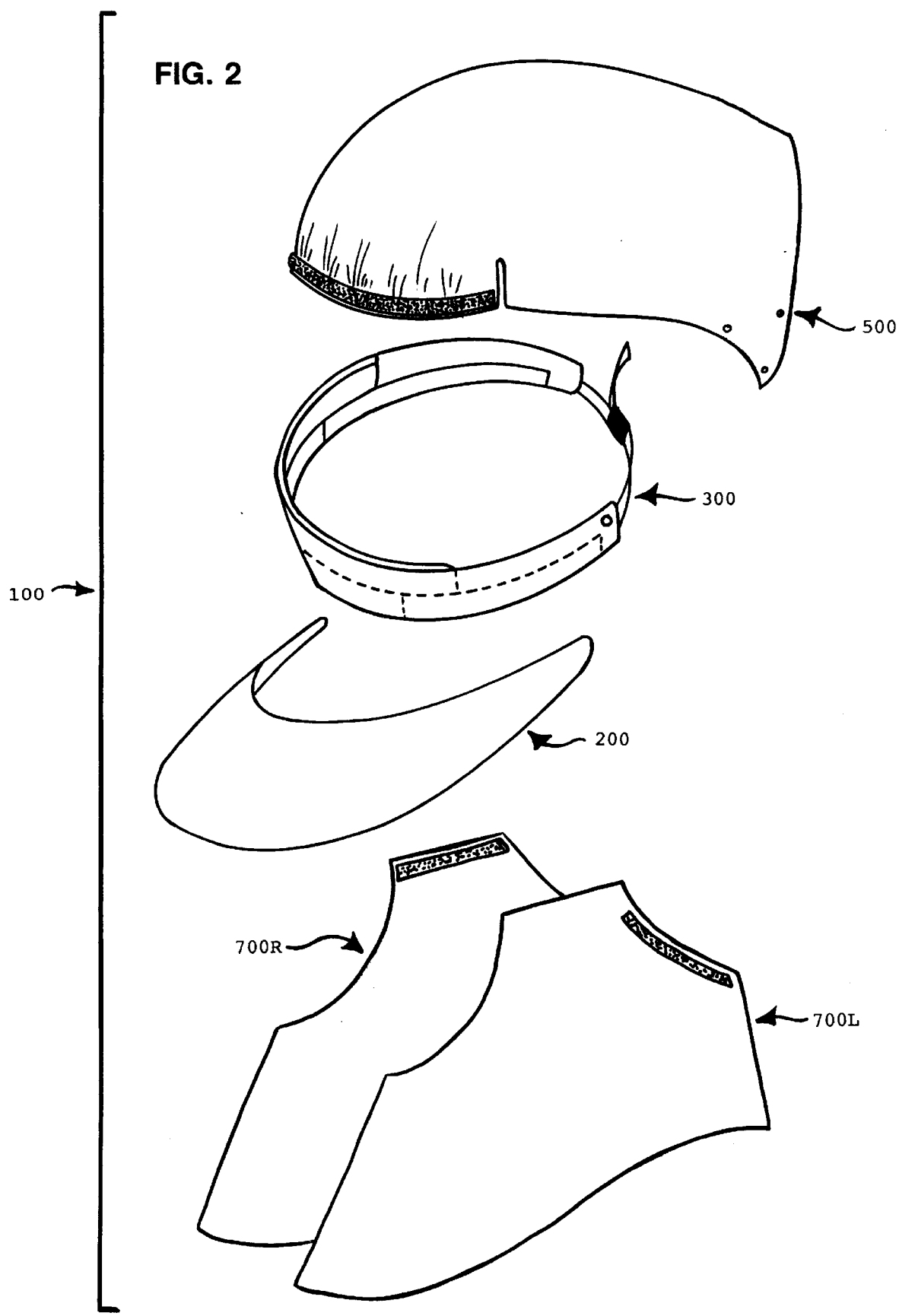
FIG. 2 is an exploded view of the parts comprising the Temperature Regulation Module.

FIG. 2 shows temperature regulation module 100 comprising the following components: a visor 200, a headband 300, a headcover 500, and a pair of side flaps 700R, 700L all designed to work together in varying combinations.

Visor

Figure 3:
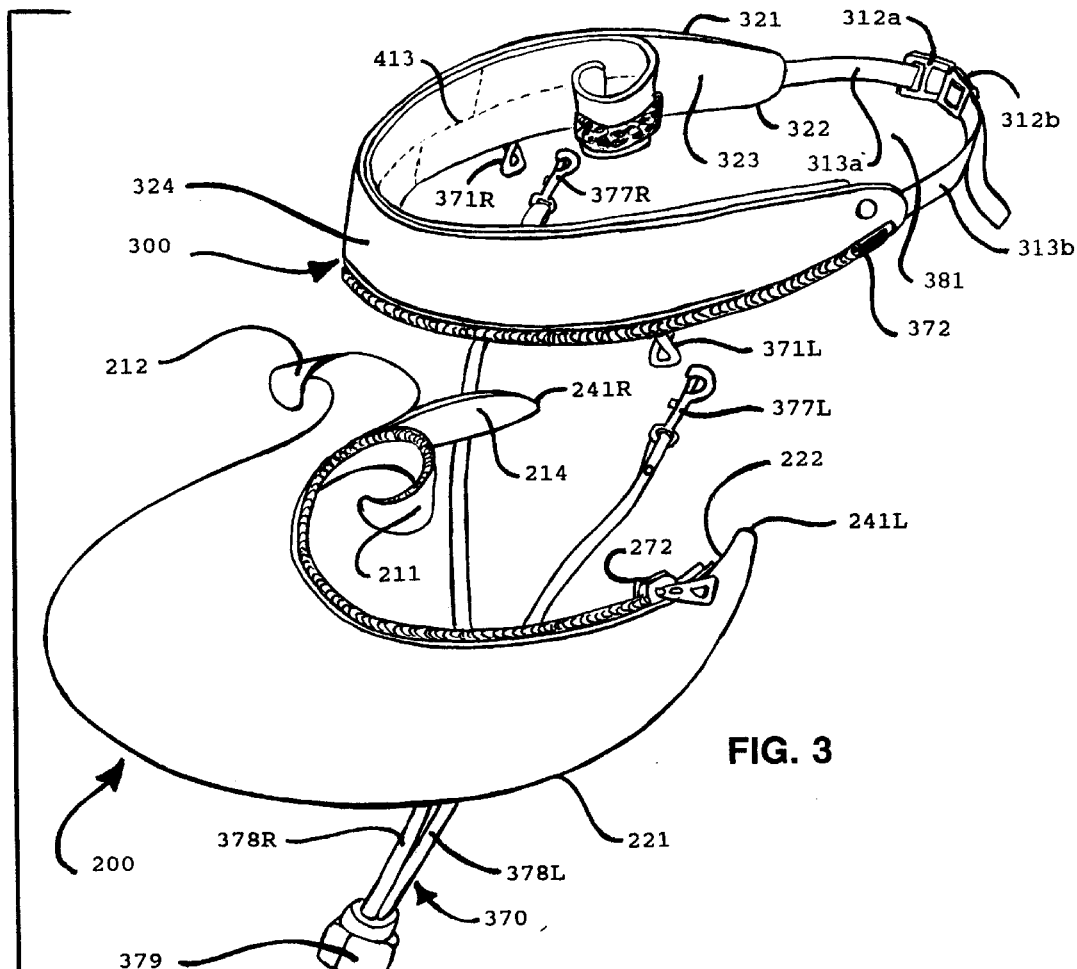
FIG. 3 is an exploded perspective view of the headband and visor.
Figure 4:
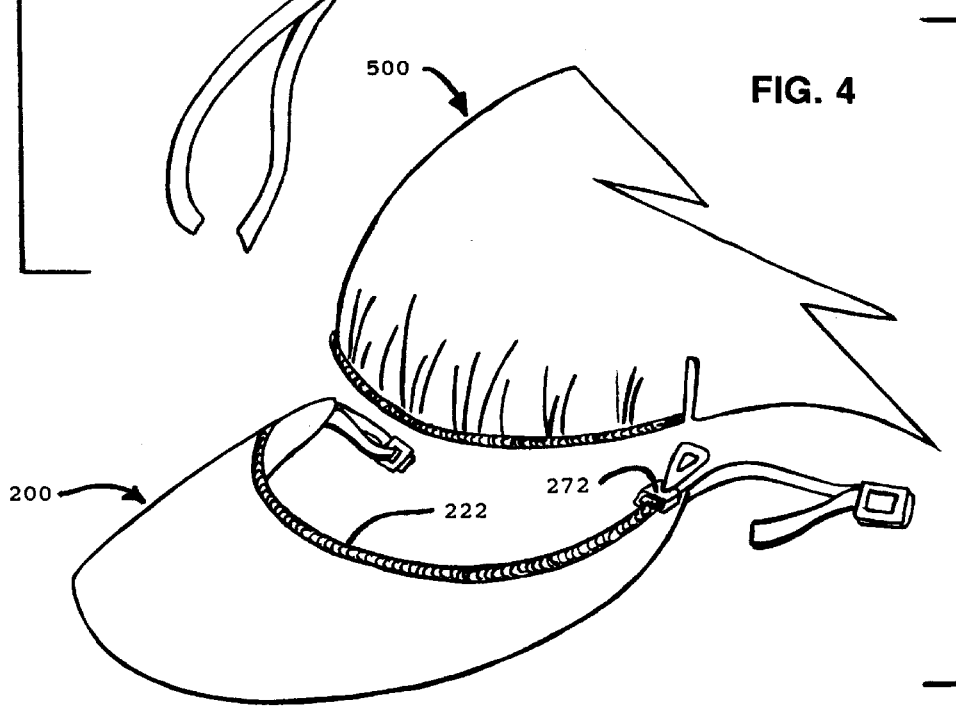
FIG. 4 is an exploded partial view of the headcover-to-visor attachment.

FIG. 3 shows visor 200, of crescent shape, with an outer rim edge 221, an inner rim edge 222, and a pair of rounded terminal points 241R and 241L. In the preferred embodiment, visor 200 is constructed of a visor stiffener 214 sandwiched between a visor topside material piece 212 and a visor underside material piece 211. Visor 200 is attachable to headband 300 or headcover 500 (see FIG. 4) along inner rim edge 222. The attachment is attained by sewing, by use of a visor zipper 272, or by use of a visor hook and loop fastener 274 (see FIGS. 5a, 5b, and 6).

Headband

FIGS. 7a and 7b show headband 300 comprising a headband material piece 311 and a stiffener such as an interfacing 315. Interfacing 315 is sewn or fused to headband material piece 311.

Headband 300 further includes a headband buckle 312a, 312b which is two-piece and releasable. Each half of headband buckle 312a, 312b is attached to one of a pair of headband straps 313a and 313b, and headband straps 313a and 313b are attached to a pair of elastic pieces 314a and 314b. Elastic pieces 314a and 314b are stitched to headband material piece 311 through interfacing 315. Headband material piece 311 is then folded in half lengthwise.

FIG. 3 shows headband 300 folded in this manner, and with headband buckle 312a, 312b connected. Thus, headband 300 presents a circular shape with a crown opening 381, a headband superior edge 321, a headband inferior edge 322, a headband interior surface 323, and a headband exterior surface 324.

FIG. 3 also shows headband 300 provided with a hat retention device 370 that attaches to a pair of hat retention loops 371R and 371L. Hat retention loops 371R and 371L depend from headband inferior edge 322. Hat retention device 370 consists of a pair of hat retention hooks 377R and 377L attached to a pair of hat retention straps 378R and 378L held together by a sliding adjuster 379 which can be cinched up to the chin of the wearer.

FIG. 3 also shows headband 300 attachable to visor 200 along headband inferior edge 322 and visor inner rim edge 222. Attachment can be attained by sewing together or with a detachable fastening device such as a headband/visor zipper 372 or, as shown in FIGS. 5a, 5b and 6, a headband/visor hook and loop fastener 374.

FIG. 5a and 5b show headband 300 connected to visor 200, creating a pair of juncture clefts 281R and 281L where rounded terminal points 241R and 241L intersect with headband inferior edge 322.

Figure 8:
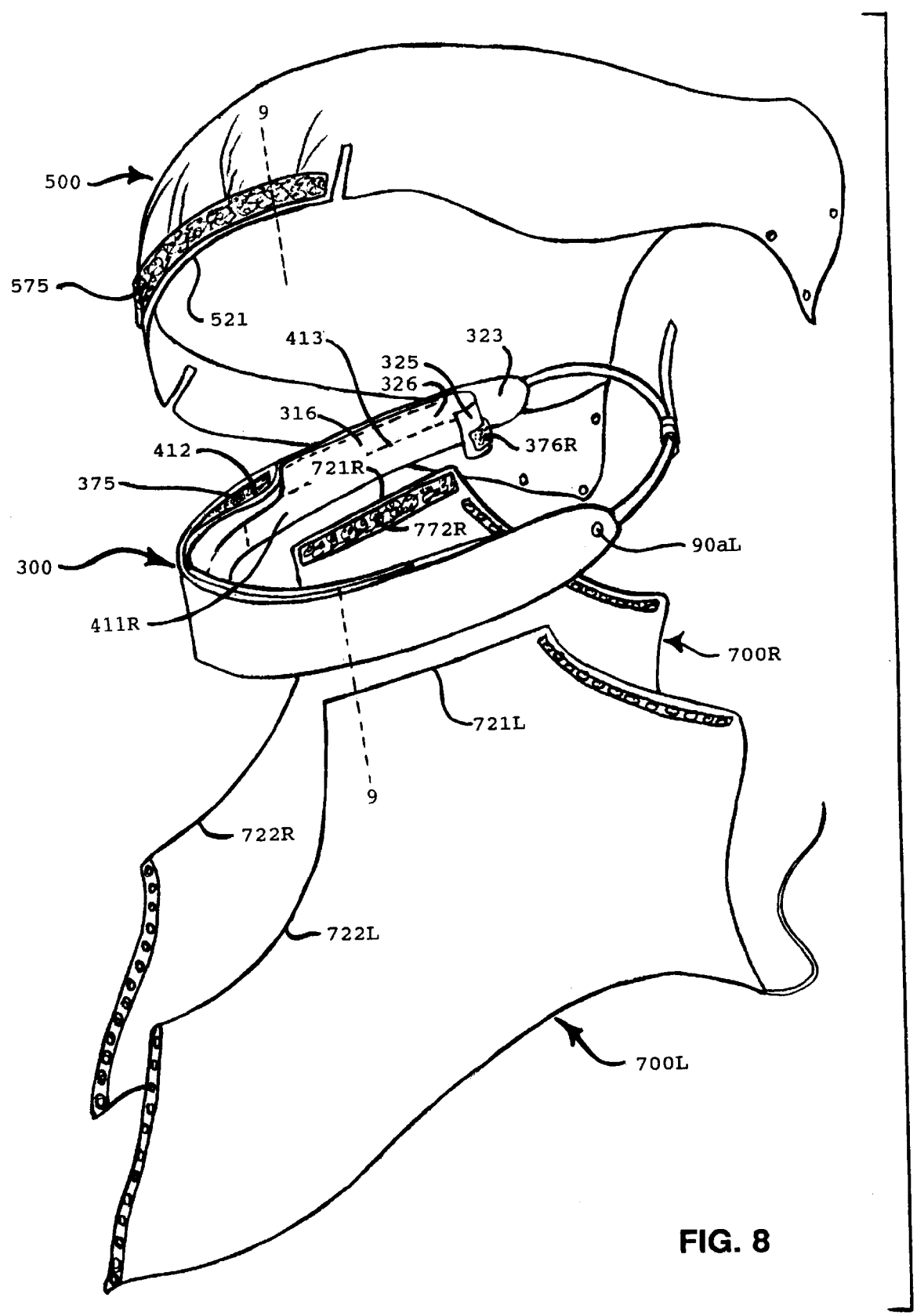
FIG. 8 is an exploded perspective view of the headcover, headband, and side flaps.
Figure 9:
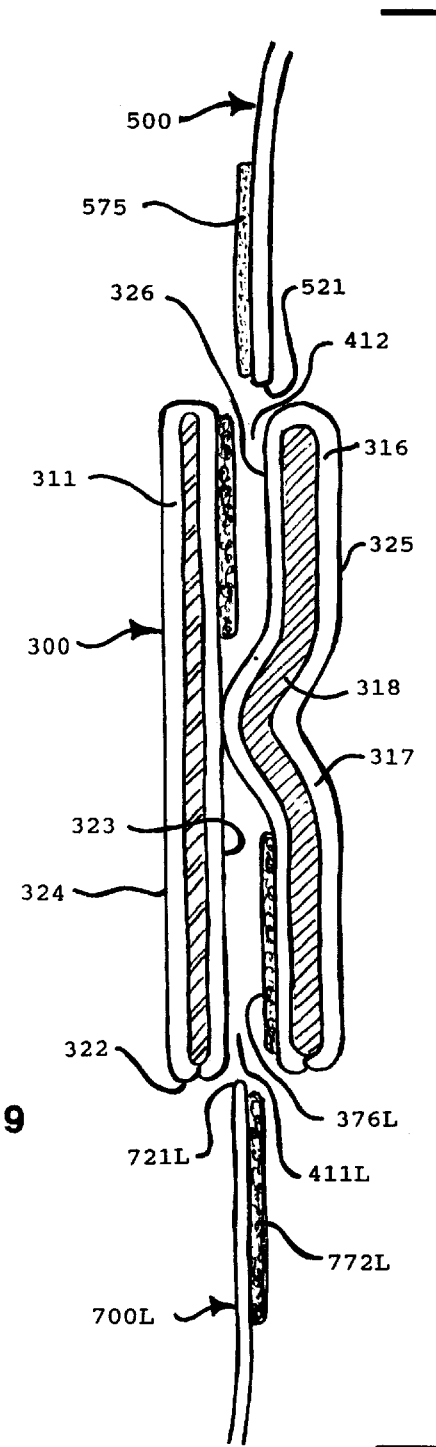
FIG. 9 is an exploded sectional view taken along the line 9—9 of FIG. 8.

Between headband interior surface 323 and the wearer's head is a headband liner 316 as illustrated in FIGS. 8 and 9. Headband liner 316 is comprised of a headband liner material piece 317 which can be folded to encase a padding 318 to protect the wearer from fastening devices. Headband liner 316 has a headband liner interior surface 325 and a headband liner exterior surface 326. FIGS. 7a and 7b show headband liner 316 being stitched to headband interior surface 323. A stitching pattern 413 creates three pockets.

Figure 10:
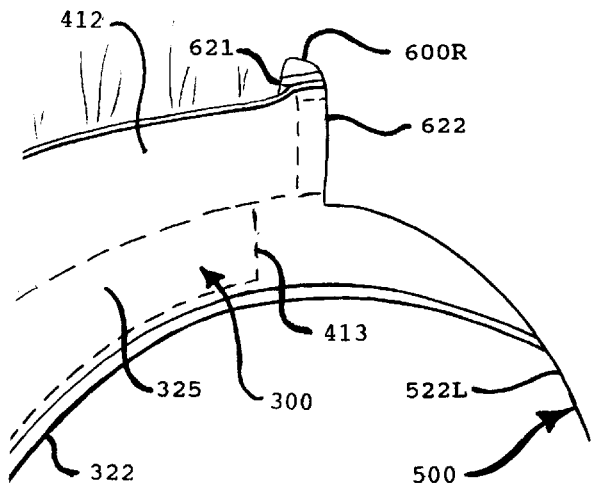
FIG. 10 is a detailed view of the pocket and the headcover-to-headband articulation.

An upper pocket 412 is centered across the forehead, accessed from above, and is designed to accept headcover 500 (see also FIG. 10). A headband/headcover fastening device 375 such as hook and loop fastener, zipper, buttons, snaps, or snap tape is attached to headband interior surface 323 inside upper pocket 412. A pair of lower pockets 411R, 411L are designed to accept side flaps 700R, 700L. Lower pockets 411R, 411L are accessed from below and contain a pair of headband/side flaps fastening devices 376R and 376L such as hook and loop fastener, zipper, buttons, snaps, or snap tape which are attached on headband liner exterior surface 326 inside pockets 411R and 411L.

FIGS. 5a, 5b, and 8 show placement on headband 300 of a pair of temperature regulation all-module fastening devices 90aR, 90aL such as snaps, hook and loop fasteners, or buttons. Temperature regulation all-module fastening devices 90aR and 90aL connect temperature regulation module 100 to insect cover module 800 or to rain cover module 900.

Headcover

Figure 11:
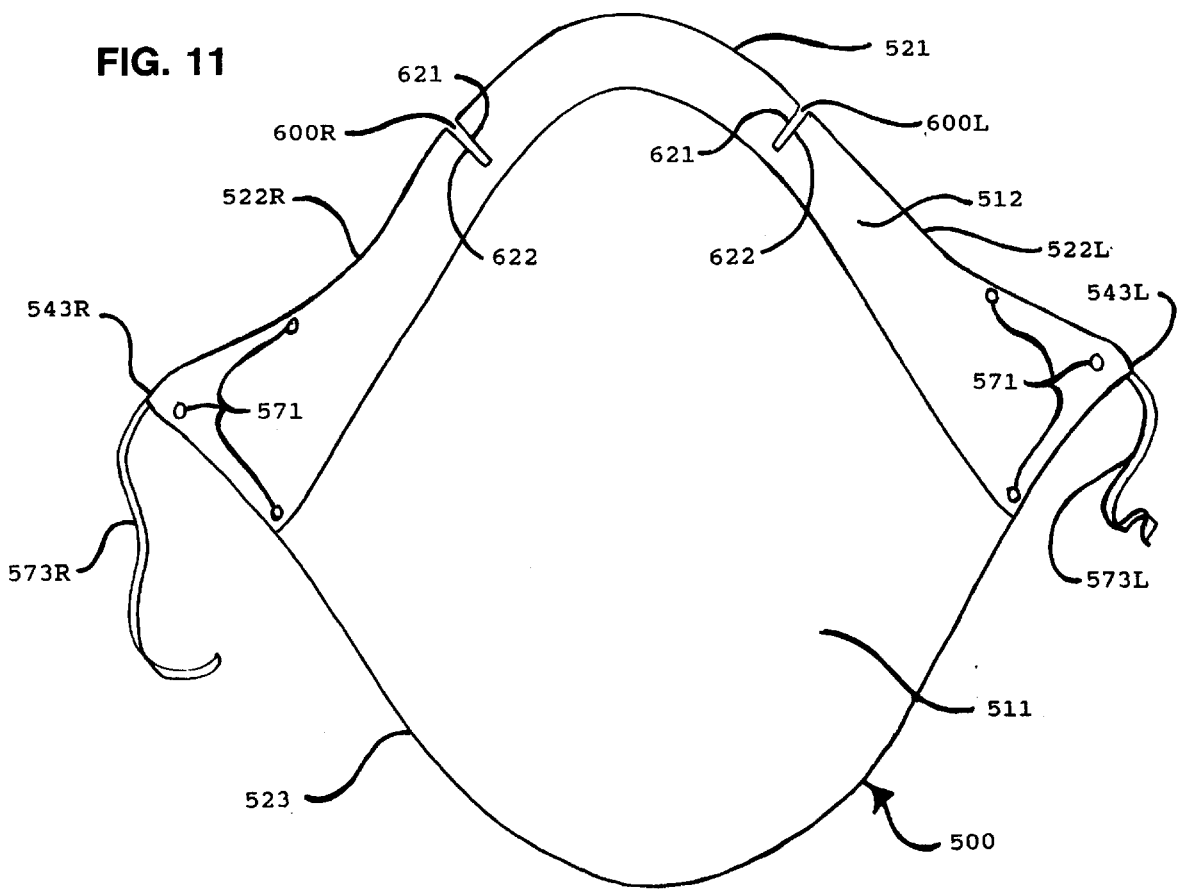
FIG. 11 is a plan view of the underside of the headcover showing the facing and the placement of the notches.
Figure 12:
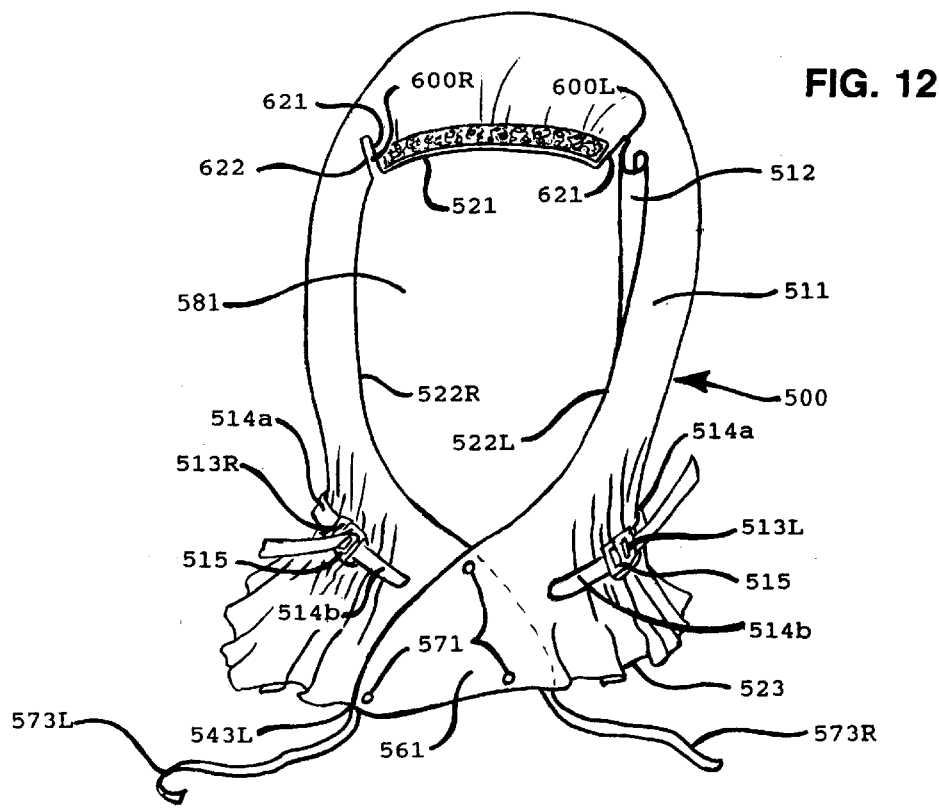
FIG. 12 is a front perspective view of the headcover showing its position when placed upon the head, and showing the side cinches and the throat closure mechanism.

FIGS. 11 and 12 show headcover 500 comprising a headcover material piece 511 and a facing 512, both of flexible material. Headcover 500 has the following edges: a superior convex edge 521, a pair of side edges 522R, 522L, and a bottom edge 523. Superior convex edge 521 terminates on both sides at approximately the temples of the wearer, where a pair of notches 600R, 600L is created by slits cut into headcover 500. In the preferred embodiment, notches 600R, 600L each has a notch superior edge 621 and a notch inferior edge 622. However, it should be noted that any reasonable configuration of slits or cutout sections is within the scope of the invention. Side edges 522R, 522L originate at notches 600R, 600L and terminate at a pair of throat points 543R, 543L created where side edges 522R, 522L intersect with bottom edge 523. Facing 512 lines headcover material piece 511 along the edges that frame the face and neck of the wearer.

FIG. 12 shows superior convex edge 521 gathered between notches 600R, 600L to conform to the shape of a human head.

FIGS. 8, 9, and 10 show headband 300-to-headcover 500 articulations. Superior convex edge 521 provides a location for a headcover fastening device 575 such as hook and loop fastener, zipper, buttons, snaps, or snap tape.

FIG. 12 shows a pair of side cinches 513R, 513L each consisting of a pair of side cinch straps 514a, 514b joined by a side cinch buckle 515. Side cinches 513R, 513L are positioned one on each side of headcover 500 approximately where the neck meets the shoulder of the wearer.

By crossing side edge 522R over or under side edge 522L, a face opening 581 and a throat closure overlap 561 are created. Throat closure overlap 561 provides an area for attachment of a throat closure fastening device 571 such as hook and loop fastener, zipper, buttons, snaps, or snap tape. In the preferred embodiment, throat closure fastening device 571 consists of an equilateral triangle of snaps. A triangle of male snaps is positioned on one side of throat closure overlap 561 and a triangle of female snaps is positioned on the other side of throat closure overlap 561.

Attached to throat points 543R, 543L are a pair of throat point fastening devices 573R, 573L such as cordage or buttons.

Side Flaps

Figure 13:
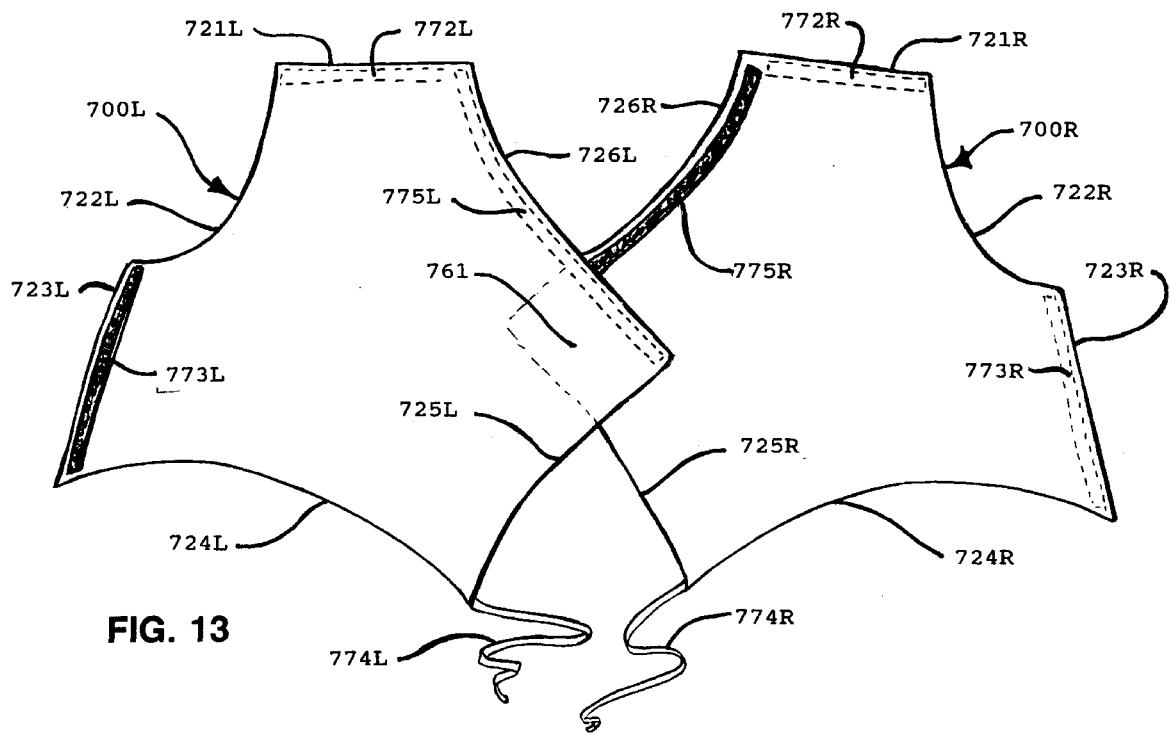
FIG. 13 is a plan view of the side flaps showing the rear overlap.

Side flaps 700R, 700L have the following edges as shown in FIG. 13: a pair of side flap superior edges 721R and 721L, a pair of side flap facial edges 722R and 722L, a pair of side flap throat closure edges 723R and 723L, a pair of side flap bottom edges 724R and 724L, side flap rear inferior edges 725R and 725L, and side flap rear superior edges 726R and 726L.

Side flaps 700R, 700L connect with headband 300, as shown in FIG. 8, along side flap superior edges 721R and 721L by use of a pair of side flap/headband fastening devices 772R, 772L such as hook and loop fastener, zipper, buttons, snaps, or snap tape. Side flap/headband fastening devices 772R, 772L are shorter in length than headband/side flap fastening devices 376R, 376L located in lower pockets 411R and 411L. The difference in length provides for a plurality of placement possibilities.

Figure 14:
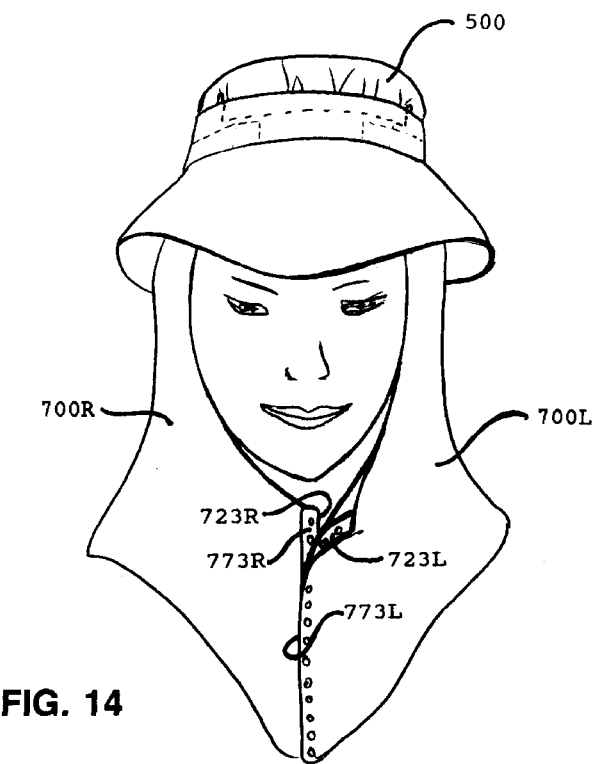
FIG. 14 is a front perspective view of a person wearing the Temperature Regulation Module with the headcover worn under the side flaps.

FIG. 14 shows side flaps 700R, 700L connected along side flap throat closure edges 723R, 723L by use of a pair of throat closure fastening devices 773R, 773L such as hook and loop fastener, zipper, buttons, snaps, or snap tape.

FIG. 13 shows a rear overlap 761 achieved by crossing rear superior edge 726R over or under rear superior edge 726L. Rear superior edges 726R, 726L provide a location for a pair of rear overlap fastening devices 775R, 775L such as hook and loop fastener, snaps, snap tape, or buttons.

A pair of bottom corner fastening devices 774R, 774L are located where rear inferior edges 725R, 725L meet side flap bottom edges 724R, 724L. Bottom corner fastening devices 774R, 774L can be ties, cords, buttons, snaps, or hook and loop fasteners.

INSECT COVER MODULE

Figure 15:
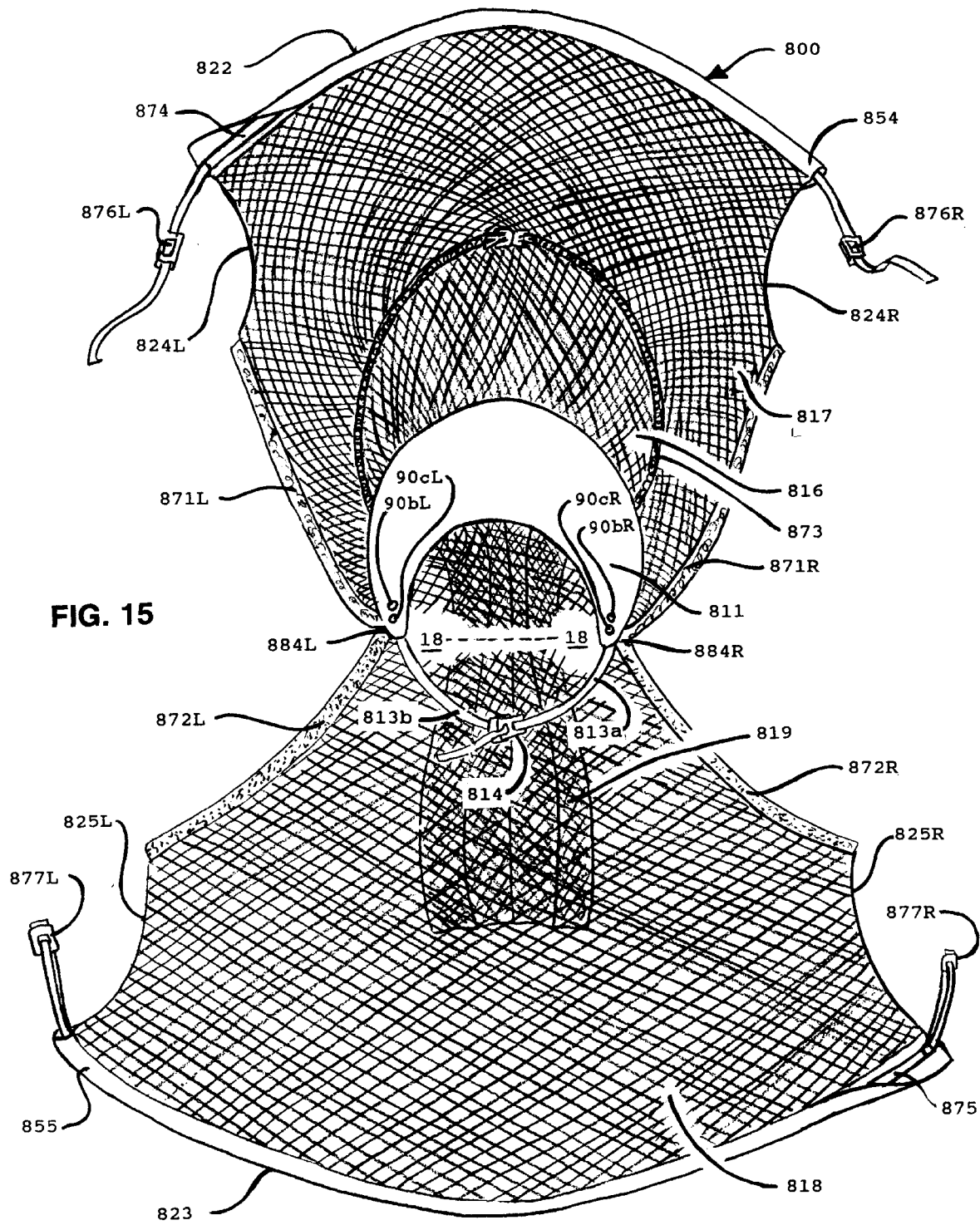
FIG. 15 is a plan view of the Insect Cover Module.
Figure 16:
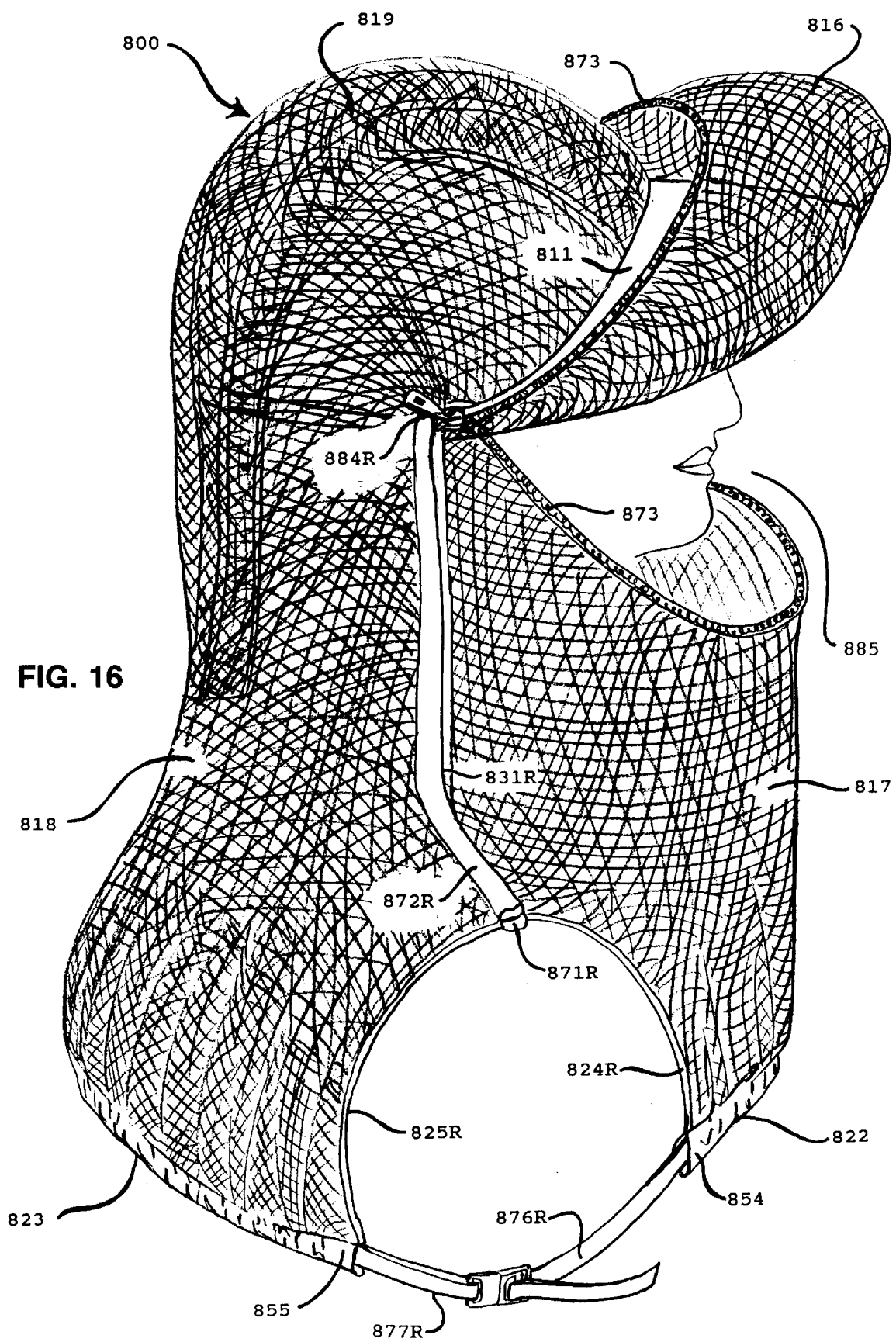
FIG. 16 is a side perspective view of the Insect Cover Module with the face panel open.
Figure 17:
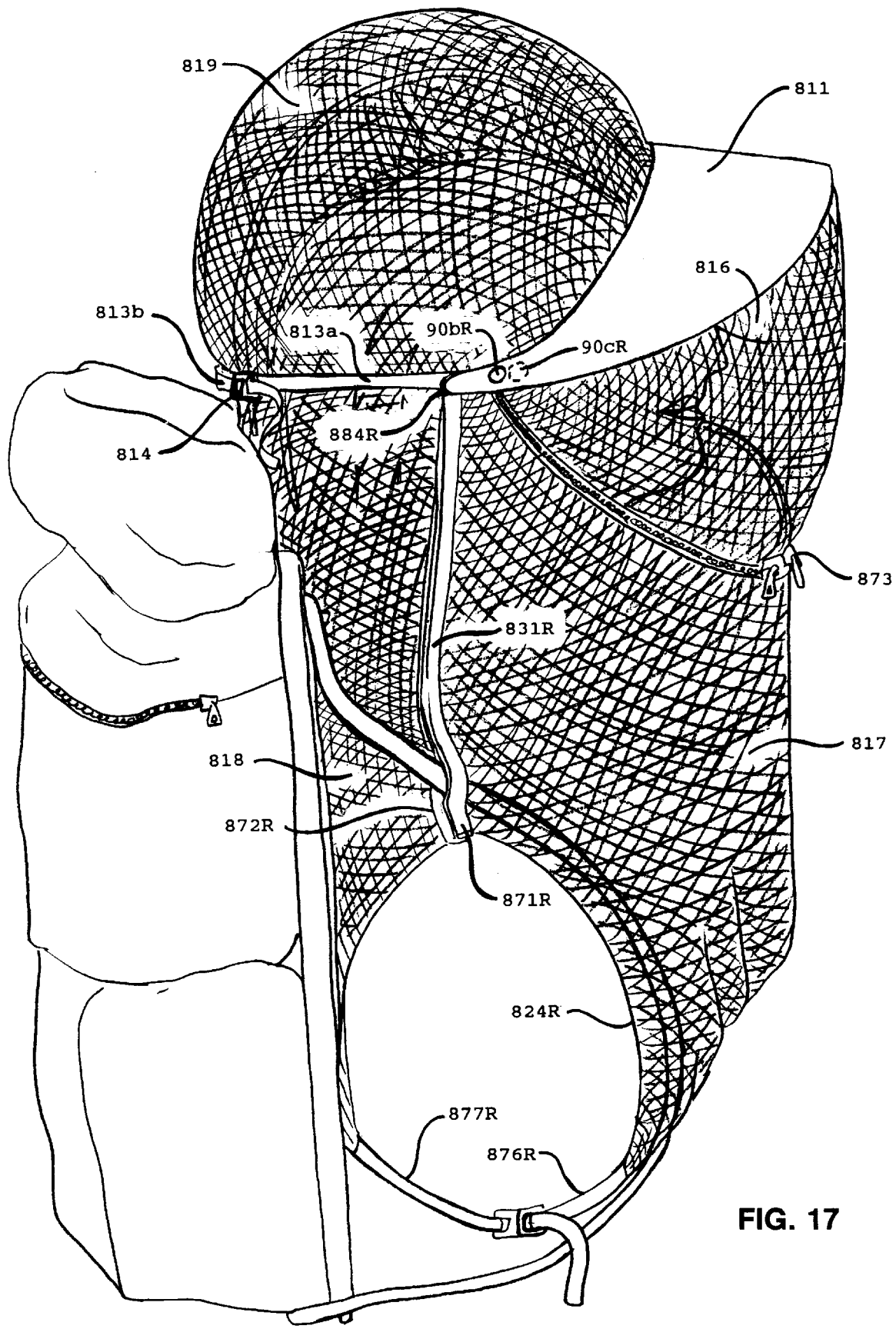
FIG. 17 is a side perspective view of the Insect Cover Module worn with a back pack.

FIGS. 15, 16, and 17 show insect cover module 800, with the following edges: a front bottom edge 822, a pair of front shoulder edges 824R, 824L, a pair of rear shoulder edges 825R, 825L and a rear bottom edge 823.

A visor cover 811 of flexible material rests upon visor 200. Visor cover 811 is connected to a pair of insect cover straps 813a, 813b and an insect cover buckle 814. Insect cover buckle 814 is two-piece and releasable. When insect cover buckle 814 is connected, a head-encircling member is created by visor cover 811, insect cover straps 813a, 813b, and insect cover buckle 814.

Insect cover module 800 further comprises a face panel 816, a front panel 817, and a rear panel 818 fortified by a crown panel 819.

Figure 18:
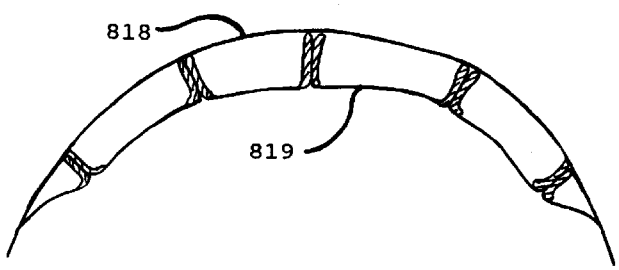
FIG. 18 is a cross-sectional view of the crown panel of the Insect Cover Module as drawn on line 18—18 of FIG. 15.

FIG. 18 is a cross-section of crown panel 819 as drawn on line 18—18 of FIG. 15. Crown panel 819 is constructed of a plurality of strips of material, sewn together, and having seams bound with a stiff binding tape to hold them in an upright position. Crown panel 819 is stitched to the underside of rear panel 818 to elevate rear panel 818 and to separate it from the top of the head of the wearer.

As illustrated in FIGS. 15, 16, and 17 face panel 816 is attached to front panel 817 by a face panel fastening device 873 such as a two-way zipper, hook and loop fastener, buttons, snaps, or snap tape. When unattached, as in FIG. 16, an insect cover face panel opening 885 is created.

A pair of side closures 831R, 831L are created where front panel 817 and rear panel 818 meet and are joined by use of a pair of front panel fastening devices 871R, 871L and a pair of rear panel fastening devices 872R, 872L such as hook and loop fastener, snaps, or snap tape. Front panel 817 and rear panel 818 can be separated at any point along side closures 831R, 831L to create openings so that straps can pass through and not compromise the insect-proof seal.

Figure 19A:
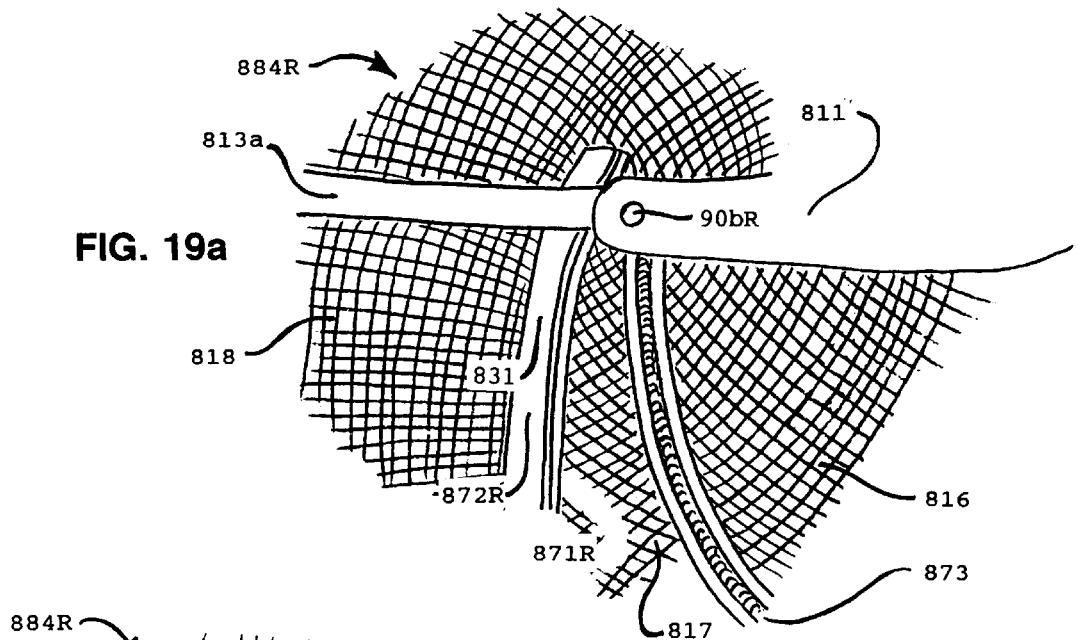
FIGS. 19a and 19b show Insect Cover Module strap placement options.
Figure 19B:
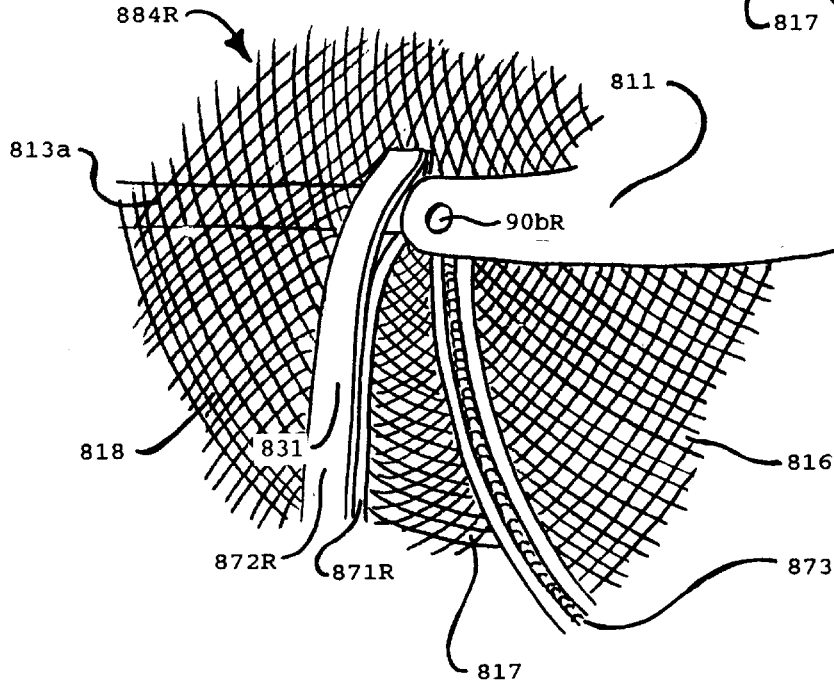

FIGS. 19a and 19b show visor cover 811, insect cover straps 813a, 813b, and side closures 831R, 831L meeting at a pair of insect cover junctures 884R, 884L. There, by creating an opening in side closures 831R, 831L, as described above, insect cover straps 813a, 813b can pass through and still maintain an insect-proof seal.

FIGS. 15 and 16 show front bottom edge 822 and rear bottom edge 823 are sewn to create a front bottom casing 854 and a rear bottom casing 855. Front bottom casing 854 contains a front bottom casing tightening device 874. Rear bottom casing 855 contains a rear bottom casing tightening device 875. Tightening devices can be elastic, shock cord, or cordage with sliding adjusters or other suitable tightening device.

Front panel 817 and rear panel 818 can also be connected by use of a pair of front underarm fastening devices 876R, 876L and a pair of rear underarm fastening devices 877R, 877L such as straps with buckles, d-rings, ties, elastic, or hook and loop fasteners.

To secure insect cover module 800 to rain cover module 900, a pair of insect cover all-module fastening devices 90cR, 90cL is secured to the outside of visor cover 811 as shown in FIGS. 15 and 17. To secure insect cover module 800 to temperature regulation module 100, a pair of insect cover all-module fastening devices 90bR and 90bL is located at approximately the same position as insect cover all-module fastening devices 90cR, 90cL but on the underside of visor cover 811. Suitable fastening devices can be snaps, hook and loop fasteners, buttons, or grommets.

RAIN COVER NODULE

Figure 20:
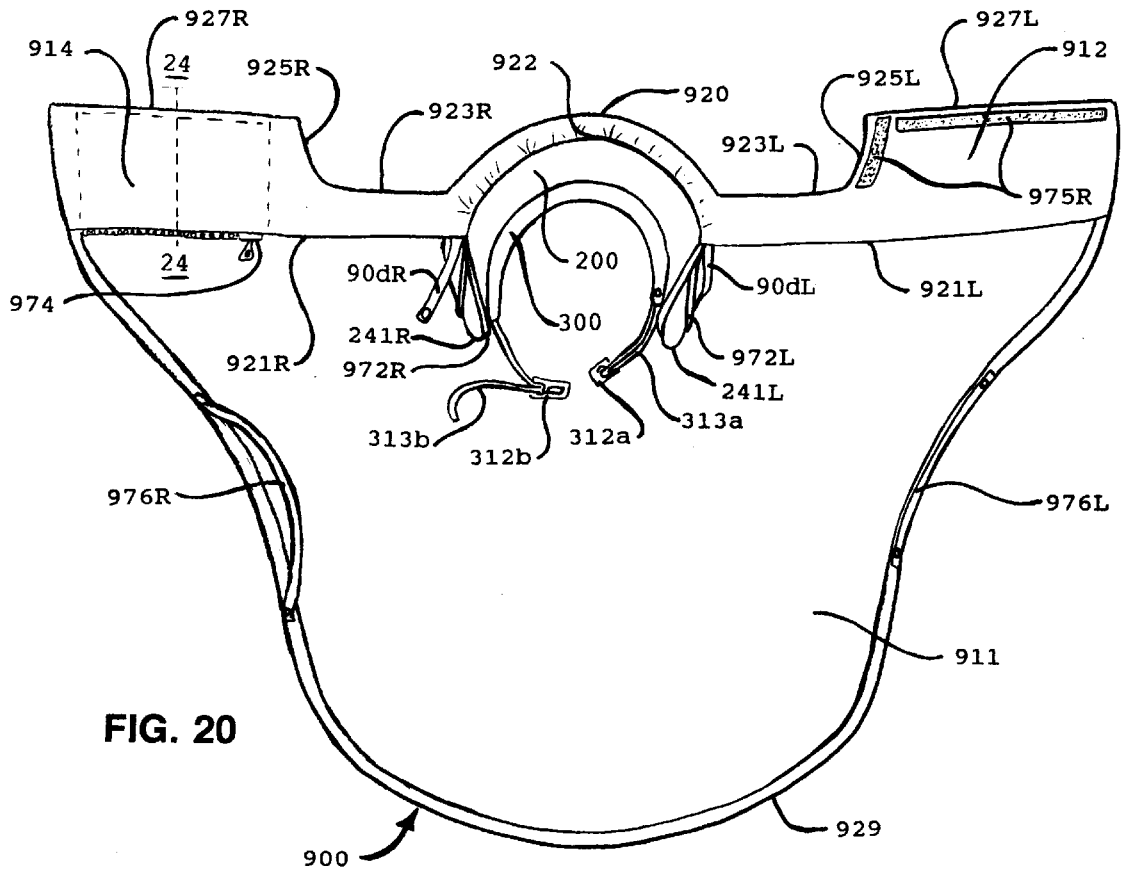
FIG. 20 is a plan view of the underside of the Rain Cover Module showing the lining, the storage bag built into the lining, and the Rain Cover Module-to-visor attachments.

FIG. 20 shows rain cover module 900 comprising a rain cover material piece 911, a rain cover lining 912, and a storage bag 914.

Figure 21A:
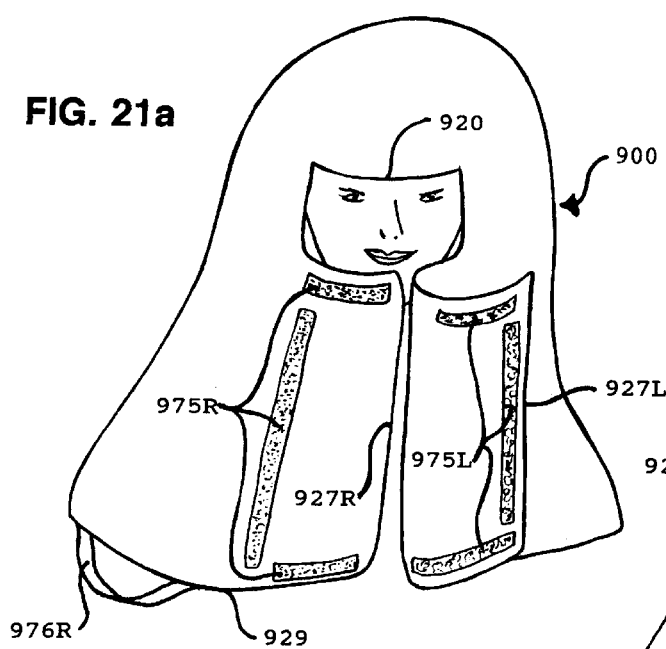
FIG. 21a is a front perspective view of a person wearing the Rain Cover Module with the rain cover overlap open.
Figure 21B:
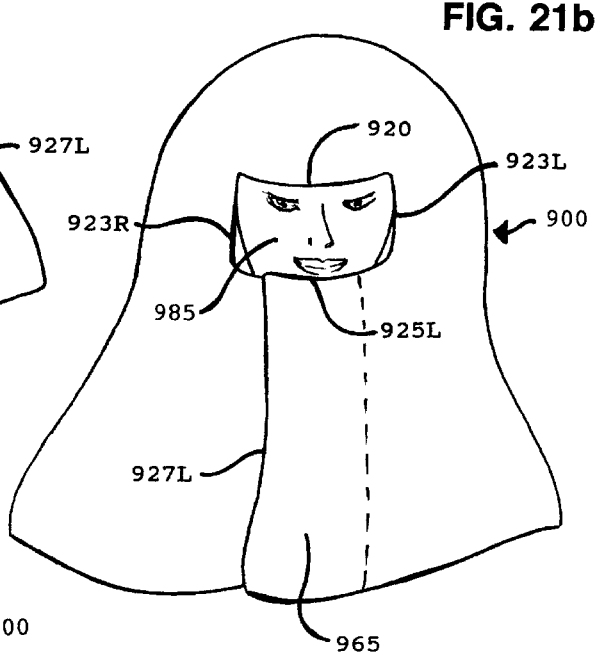
FIG. 21b is a front perspective view of a person wearing the Rain Cover Module with the rain cover overlap closed.
Figure 22:
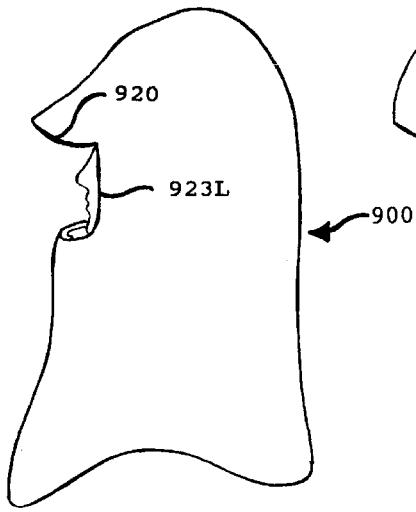
FIG. 22 is a side perspective view of a person wearing the Rain Cover Module.

FIG. 20 shows rain cover material piece 911 with a superior edge 920, a pair of vertical face edges 923R, 923L, a pair of horizontal face edges 925R, 925L, and a pair of vertical neck edges 927R, 927L. Vertical neck edges 927R, 927L descend to meet a rain cover bottom edge 929, which completes the periphery. FIGS. 21a, 21b, and 22 show the same edges with rain cover module 900 positioned upon the wearer's head.

Rain cover lining 912 is sewn to rain cover material piece 911 along all the edges that frame the face and neck of the wearer and along rain cover bottom edge 929. The remaining unattached edges of rain cover lining 912 are a pair of vertical lining edges 921R, 921L and a superior lining edge 922.

FIGS. 21a, 21b show a rain cover overlap 965 created by crossing vertical neck edge 927R over or under vertical neck edge 927L. Rain cover overlap 965 provides an area for attachment of a pair of rain cover overlap fastening devices 975R, 975L such as snaps, buttons, hook and loop fasteners, buckles or zippers. When fastened, a rain cover face opening 985 is also created.

Rain cover module 900 is provided with a pair of rain cover underarm fastening devices 976R, 976L such as loops, straps, or bands sewn to rain cover bottom edge 929. Rain cover underarm fastening devices 976R, 976L encircle the wearer's upper arm.

Figure 23:
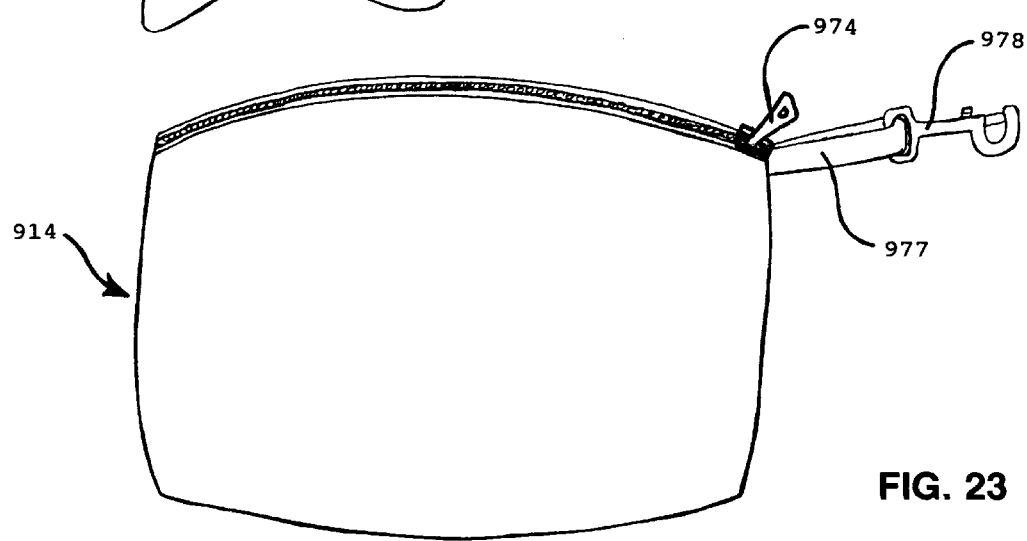
FIG. 23 is a side elevation view of the Rain Cover Module when stuffed into its storage bag.

FIG. 23 shows storage bag 914 made of a rectangular shape of waterproof material folded in half and stitched on two sides with a storage bag zipper 974 for closure on the fourth side. Sewn into the side seam of storage bag 914 is a storage bag loop 977 which holds a storage bag hook 978.

Figure 24:
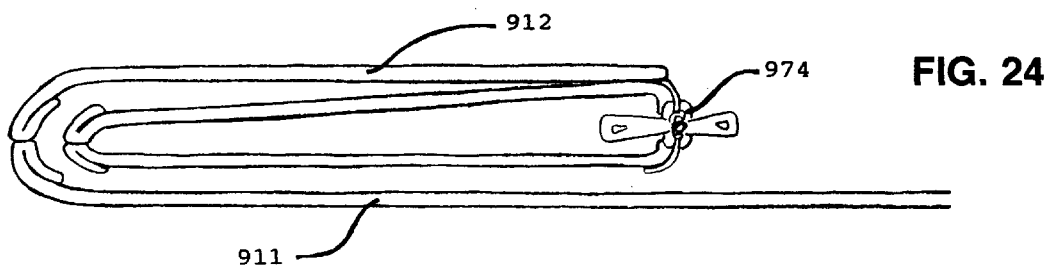
FIG. 24 is a cross-sectional view of the storage bag of the Rain Cover Module as drawn on line 24—24 of FIG. 20.

FIG. 24 is a cross-section of storage bag 914 as drawn on line 24—24 of FIG. 20. When constructed, storage bag 914 is inverted and inserted between rain cover material piece 911 and rain cover lining 912. Storage bag 914 is then stitched to rain cover lining 912 with storage bag zipper 974 opening on vertical lining edge 921R or vertical lining edge 921L.

FIG. 20 is a plan view of the underside of rain cover module 900 showing visor 200 inserted between rain cover material piece 911 and rain cover lining 912 along superior edge 920. Rain cover module 900 is secured by a pair of rain cover/visor attachment devices 972R, 972L which originate where superior lining edge 922 intersects on each side with vertical lining edges 921R, 921L. Rain cover/visor attachment devices 972R, 972L can be loops of elastic that hook around rounded terminal points 241R, 241L and are held in place by juncture clefts 281R, 281L (see FIG. 25).

Figure 25:
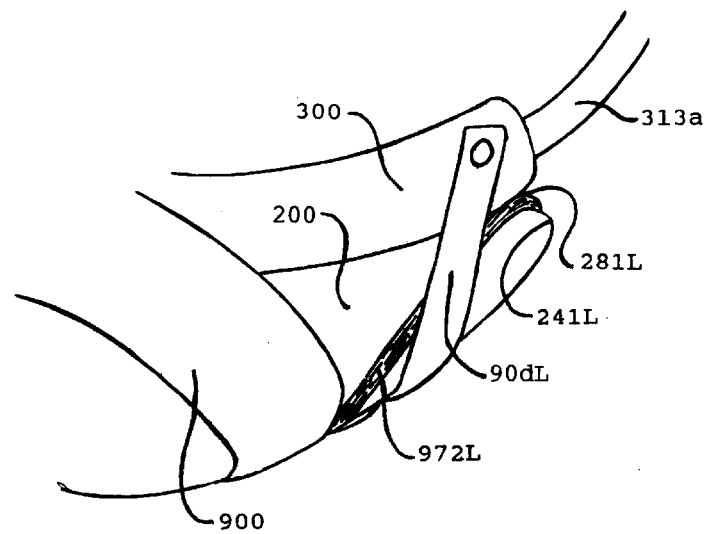
FIG. 25 is a detailed view of the Rain Cover Module with the material lifted to expose the all-module fastening device and the Rain Cover Module-to-visor attachment.

Rain cover module 900 can be secured to either insect cover module 800 or temperature regulation module 100. FIGS. 20 and 25 show rain cover module 900 provided with a pair of rain cover all-module fastening devices 90dR and 90dL such as straps with buttons, snaps, grommets, or hook and loop fasteners. Rain cover all-module fastening devices 90dR and 90dL originate where superior lining edge 922 intersects on each side with vertical lining edges 921R, 921L.

OPERATION

The Modular Head Covering System includes three primary modules as shown in FIG. 1: temperature regulation module 100, insect cover module 800, and rain cover module 900. The modules and their components are designed to work intimately together in a variety of combinations to provide protection from the elements and insects. The Modular Head Covering System can be used in many ways, depending on the weather conditions, environmental factors, or the needs or mood of the wearer. The uses are detailed in the following operational description.

TEMPERATURE REGULATION MODULE

Temperature regulation module 100 includes the following components as shown in FIG. 5a visor 200, headband 300, headcover 500, and side flaps 700R, 700L.

Headband

Headband 300 is a head-encircling member and is attachable to, and releasable from, any of the remaining components, best illustrated in FIG. 3. Headband 300 can be worn alone to warm the ears or to hold the wearer's hair in place in windy conditions. Headband 300 can be constructed of moisture-absorbent fabrics and worn as a sweatband.

To wear headband 300, headband strap 313a with one side of headband buckle 312a is connected to its mate headband strap 313b with the other side of headband buckle 312b. Headband strap 313b is pulled to tighten. Enclosed elastic pieces 314a and 314b provide for a tighter fit (see FIG. 7a).

FIGS. 3, 5a, and 5b show hat retention device 370 which can be employed during high winds to secure headband 300 to the head, particularly when headband 300 and visor 200 are connected, as discussed below. To employ hat retention device 370, connect hat retention hooks 377R and 377L to hat retention loops 371R and 371L and snug sliding adjuster 379 up to the chin. To remove, simply disconnect hat retention hooks 377R and 377L.

Figure 26:
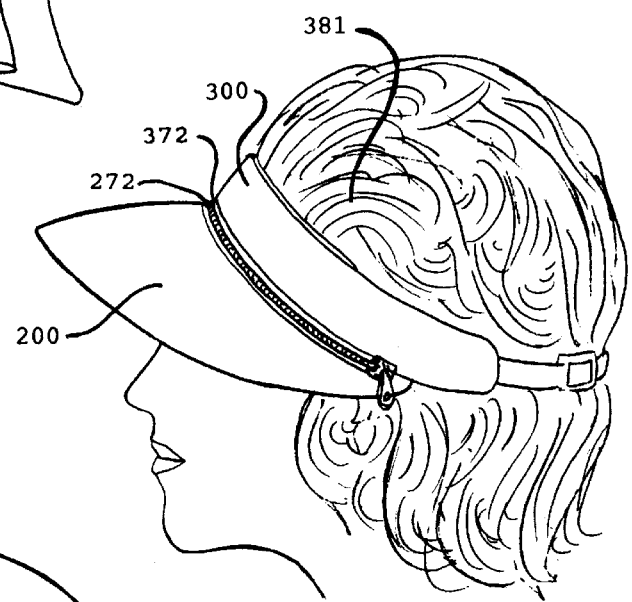
FIG. 26 is a side perspective view of the headband worn with the visor, and a visor-to-headband fastening device in the form of a zipper.

FIG. 26 shows headband 300 worn with visor 200 only. When worn in this fashion the wearer's head emerges from crown opening 381 allowing for maximal heat loss and ventilation, while still shading the face.

FIG. 8 shows headband 300 equipped with upper pocket 412 which provides a location for the attachment of headcover 500 (see also FIG. 10). Headband 300 is also equipped with lower pockets 411R, 411L which provide locations for the attachment of side flaps 700R, 700L. Pockets are created by stitching pattern 413 which joins headband liner 316 to headband interior surface 323. Headband liner 316 also protects the wearer's head from fastening devices.

Visor

Figure 27:
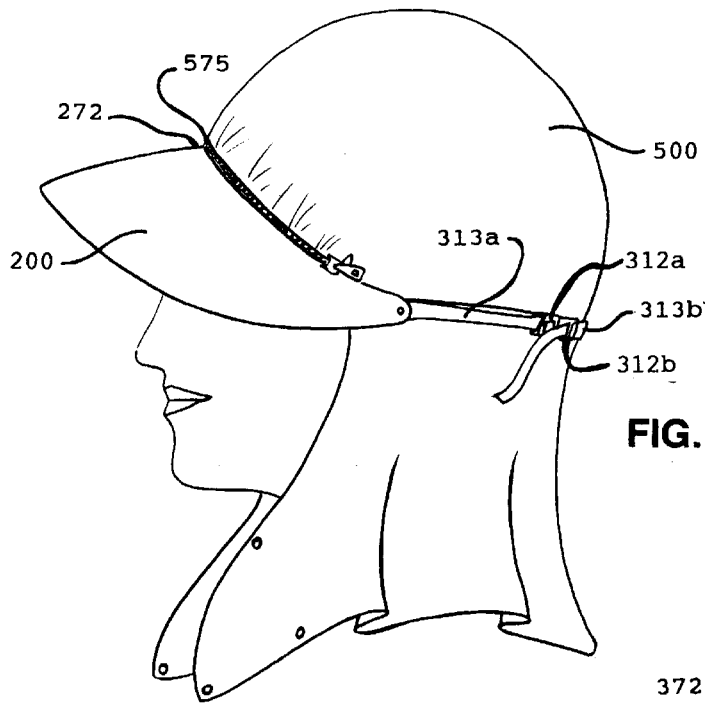
FIG. 27 is a side perspective view showing a person wearing the visor and the headcover and showing the visor as a head-encircling member.

FIGS. 26 and 27 show visor 200 which can be employed to shade the face from sun or poorly placed indoor lighting. To attach visor 200 to headband 300, connect visor zipper 272 to headband/visor zipper 372 as shown in FIG. 26, or connect visor hook and loop fastener 274 to headband/visor hook and loop fastener 374 as shown in FIG. 5.

Figure 28:
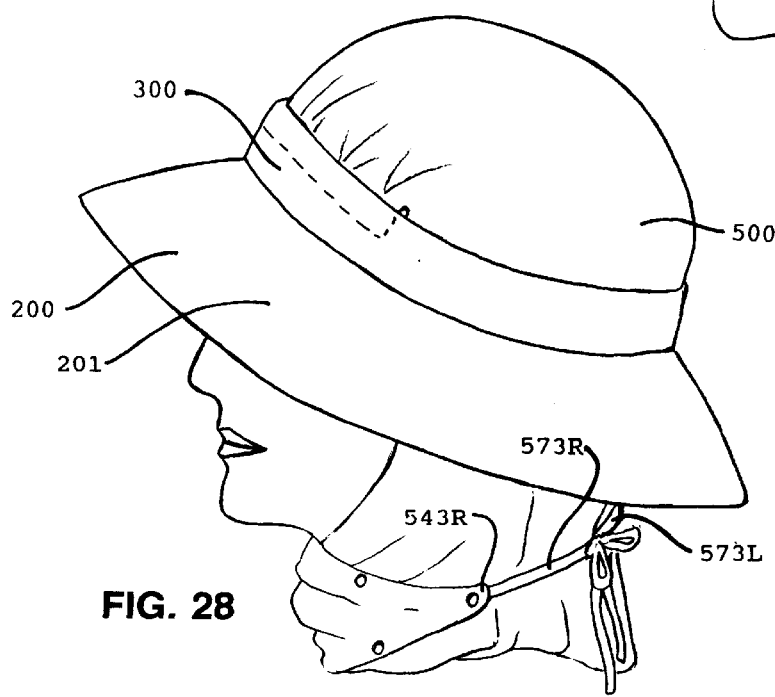
FIG. 28 is a side perspective view showing the visor expanded to encircle the head and the headcover throat points wrapped around the neck.

Visor 200 can also be constructed as its own head-encircling member. This can be accomplished in several ways such as: visor 200 can be attached directly to headband strap 313a, 313b and headband buckle 312a, 312b as shown in FIG. 27, or, visor 200 can be expanded to become a brim 201 which completely encircles the head as shown in FIG. 28.

Visor 200, when constructed as its own head-encircling member, can be worn with (see FIG. 27) or without (not shown) headcover 500.

Headcover

Headcover 500 is used when the wearer needs shade, warmth, or wind protection on his/her head, neck, and throat. To employ headcover 500, as shown in FIGS. 8 and 9, open upper pocket 412 on headband 300 and attach headcover fastening device 575 to headband/head cover fastening device 375. In an alternate embodiment, headcover 500 can also attach directly to visor 200 as seen in FIG. 27.

Figure 29:
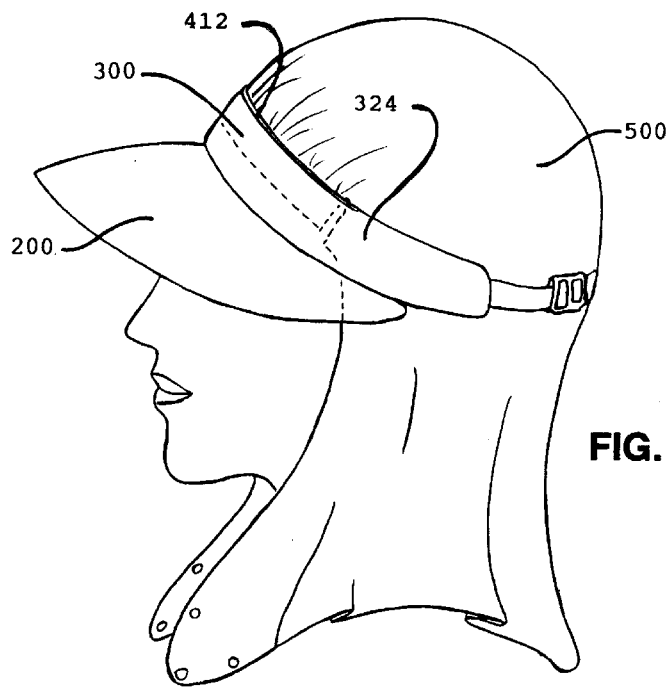
FIG. 29 is a side perspective view of the headcover being worn under the headband.
Figure 30:
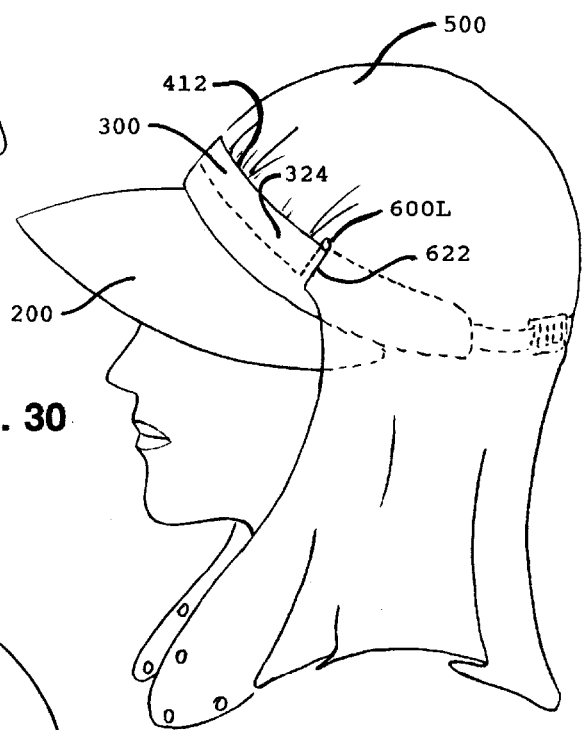
FIG. 30 is a side perspective view of the headcover being worn over the headband.

FIGS. 29 and 30 pertain to notches 600R, 600L in headcover 500. Notches 600R, 600L are crucial to the operation of temperature regulation module 100. When headcover 500 is attached to headband 300 the attachment terminates on each side at notch 600R or 600L where notch superior edge 621 fits into upper pocket 412 and notch inferior edge 622 remains outside upper pocket 412. It is important to understand that notch inferior edge 622 can then be placed in one of two possible positions that are determined by the placement of headcover 500 over headband 300 as seen in FIG. 30 or under headband 300 as seen in FIG. 29. If headcover 500 is placed over headband 300, notch inferior edge 622 lies flat along headband exterior surface 324. If headcover 500 is placed under headband 300 then notch inferior edge 622 lies flat along headband liner interior surface 325 (see also FIG. 10). If the wearer needs to retain body heat, as in cool weather, headcover 500 is placed under headband 300, as shown in FIG. 29. If the wearer needs more ventilation, as in warm weather, headcover 500 is placed over headband 300, as shown in FIG. 30.

Figure 31:
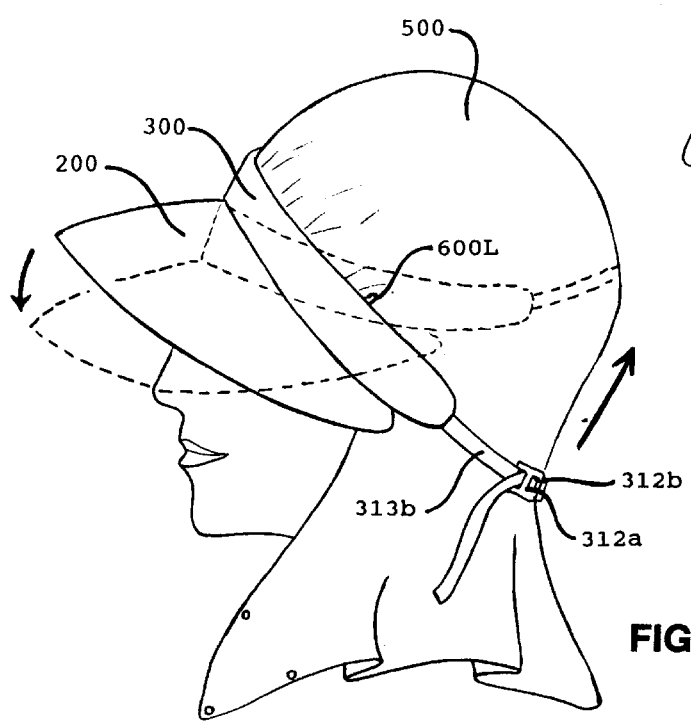
FIG. 31 is a side perspective view indicating the variable crown depth and placement possibilities of the headband and visor as they relate to the headcover.

FIG. 31 shows headcover 500 attached to visor 200/ headband 300 and placed upon the head of the wearer. Headcover 500 and headband 300 are attached to one another only between notches 600R and 600L across the forehead. Therefore, headband 300 and headcover 500 can move independently of one another across the back of the head. This novel feature allows the wearer to position the visor at an angle appropriate to the sun, and to raise or lower the position of headband 300 on the back of the head, thereby altering the depth of the crown. Consequently, visor 200 can be worn high up on the wearer's forehead or low down over the wearer's eyes. Also, headband 300 can be worn low and under the occipital protrusion of the skull or, high up on the back of the head creating more air space between the back of the head and headcover 500.

Figure 32A:
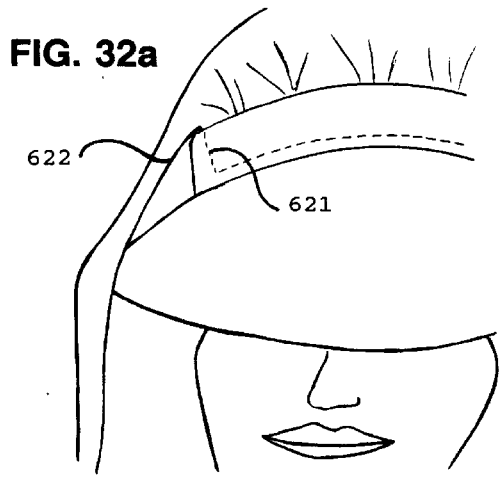
FIGS. 32a and 32b are partial front perspective views showing headcover notch options.
Figure 32B:
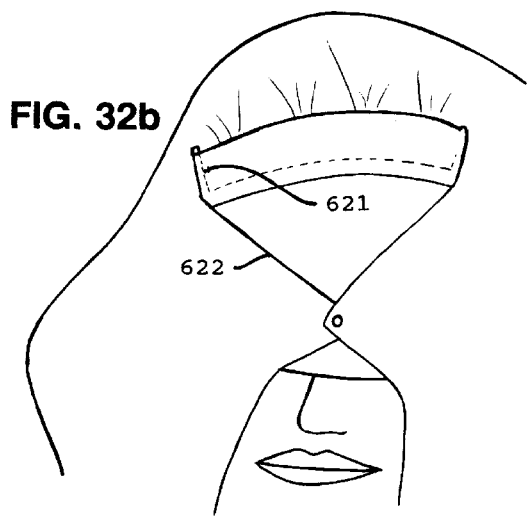

FIGS. 32a and 32b show alternate embodiments created by varying the length of notch inferior edge 622R, 622L which increases or decreases the amount of fabric available to protect the face.

Figure 33:
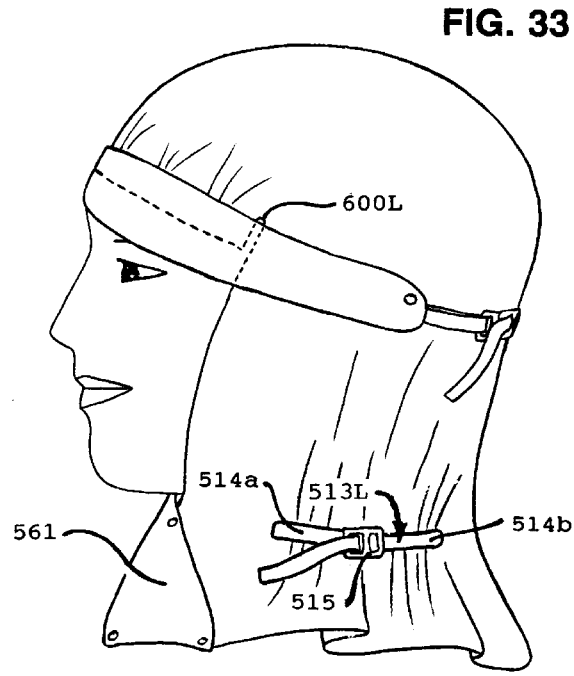
FIG. 33 is a side perspective view showing the headcover with side cinches being worn in combination with the headband.
Figure 34A:
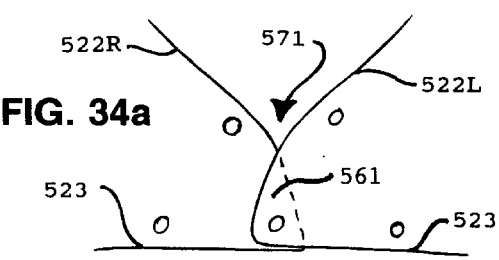
FIGS. 34a through 34d are detailed views of headcover throat closure overlap fastening options.
Figure 34B:
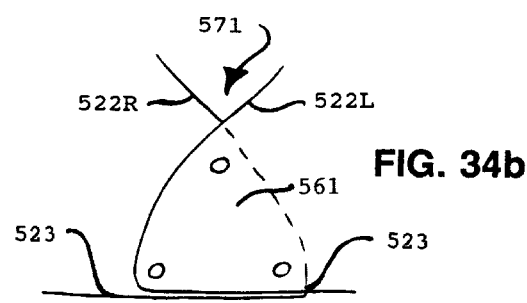
Figure 34C:
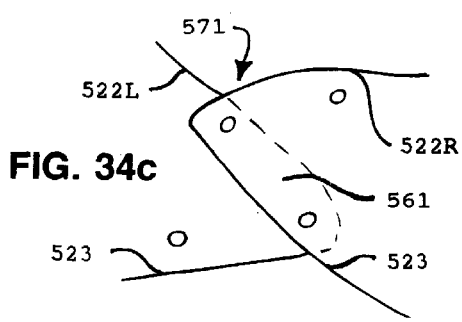
Figure 34D:
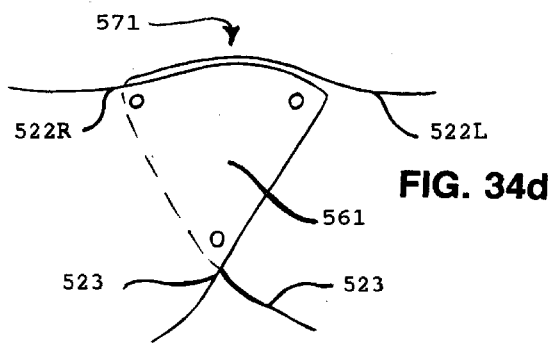

FIGS. 12 and 33 show side cinches 513R, 513L which can be employed to seal out drafts. On each side, employ side cinch buckle 515 and pull on side cinch strap 514a or 514b to tighten. To release, unbuckle side cinch buckle 515 or simply loosen side cinch strap 514a or 514b.

FIG. 33 and FIGS. 34a through 34d show throat closure overlap 561 which provides an area for attachment of headcover throat closure fastening device 571. In the preferred embodiment, throat closure fastening device 571 creates an equilateral triangle of snaps. FIGS. 34a through 34d illustrate how, by joining one, two, or three snaps, or by rotating the triangle of male snaps as it relates to the triangle of female snaps, a plurality of closure configurations is possible.

Figure 35:
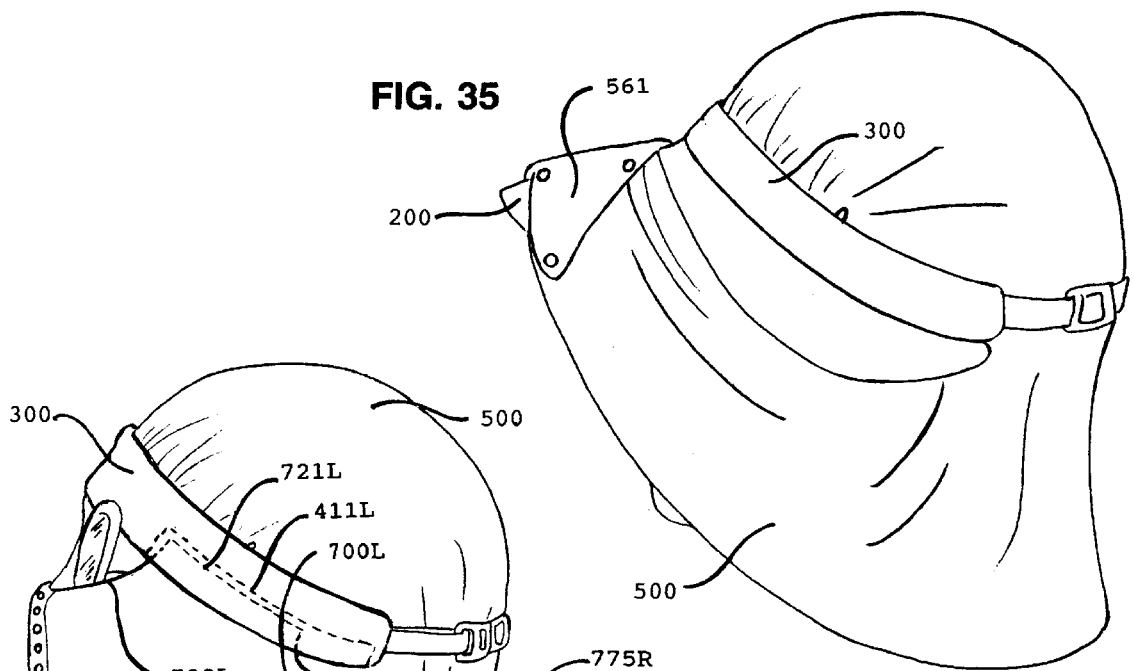
FIG. 35 is a side perspective view of the headcover snapped above the visor.

In any of its possible closure configurations, throat closure overlap 561 can be placed in front of the throat, as shown in FIG. 33, behind the neck (not shown), or resting on top of visor 200 as shown in FIG. 35. These options allow the wearer to create shade as needed, retain warmth, or create a fashionable look.

FIG. 28 shows throat closure points 543R, 543L wrapped around the neck like a scarf and then tied using throat points fastening devices 573R, 573L.

FIGS. 29 and 33 show embodiments which can be adapted for cold weather conditions. Headcover 500 can be made of warm fabric or multiple layers of fabric such as, but not limited to, wind-proof nylon lined with polar fleece. With headcover 500 attached to visor 200/headband 300, as shown in FIG. 29, the wearer is prepared for cold, sunny conditions. Headcover 500/headband 300 can also be used without visor 200 as shown in FIG. 33. This option is appropriate for cold conditions after sunset or for wearing while sleeping.

Side Flaps

Figure 36A:
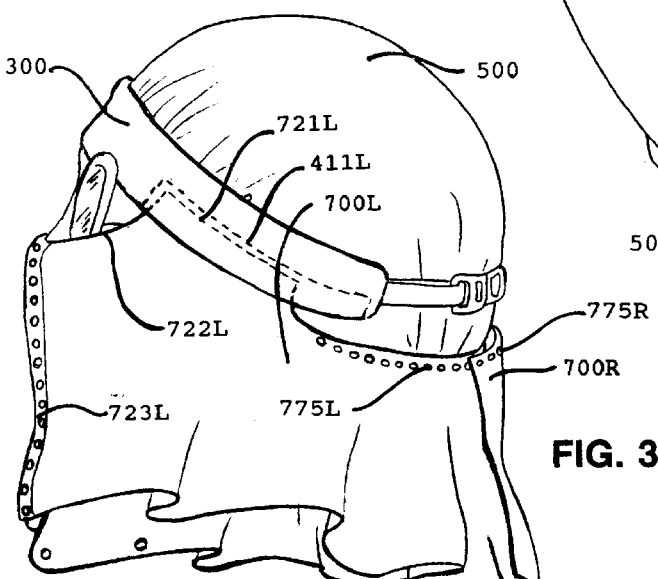
FIGS. 36a and 36b are side perspective views showing side flap placement options.
Figure 36B:
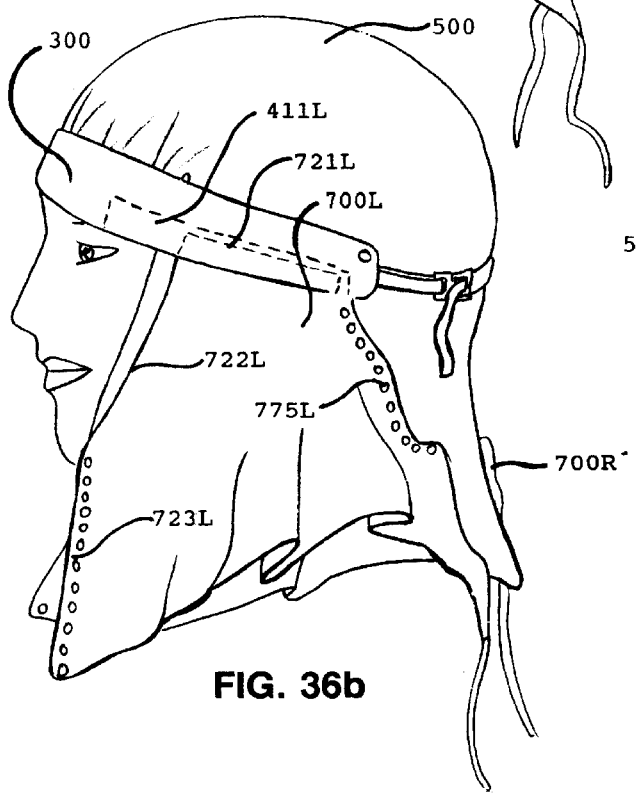

FIGS. 36a and 36b show side flaps 700R, 700L as they are used to provide shade on the face and neck, and dust protection for the nose and mouth. To employ side flaps 700R, 700L, open lower pocket 411R on headband 300, as shown in FIGS. 8 and 9, attach side flap/headband fastening device 772R to headband/side flap fastening device 376R, and repeat above for left side flap 700L.

FIGS. 36a and 36b show placement options possible for side flaps 700R, 700L, which are moveable within lower pocket 411R, 411L. To utilize this feature, position side flap/headband fastening device 772R, 772L as far forward or backward as headband/side flap fastening devices 376R, 376L allow. Thus, protection can be moved closer to the face or further back on the head. The forward position can create a seal around eye glasses and can cover the nose and mouth in dusty conditions.

Figure 37:
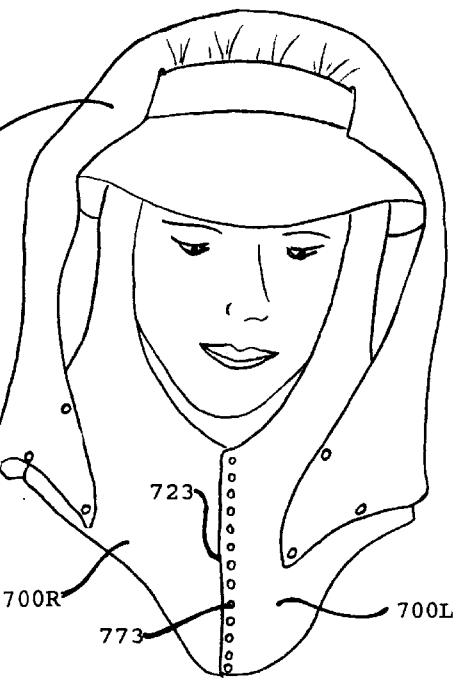
FIG. 37 is a front perspective view showing the headcover being worn over the headband and over the side flaps.

FIG. 37 shows side flaps 700R, 700L closed at the throat to provide shade, insulation, and protection from wind and cold. To employ, fasten side flap throat closure fastening device 773R to side flap throat closure fastening device 773L.

Figure 38A:
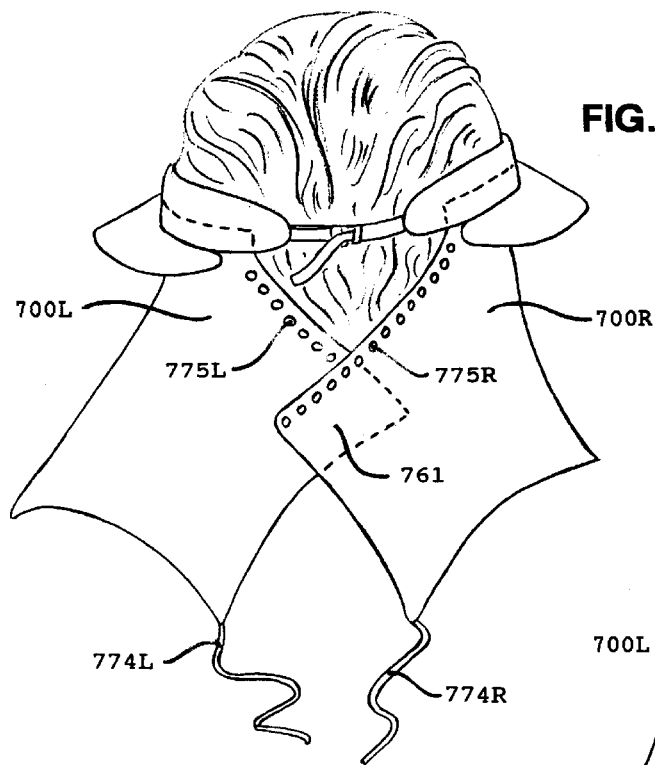
FIGS. 38a and 38b are rear perspective views of the side flap rear overlap options and component combination options.
Figure 38B:
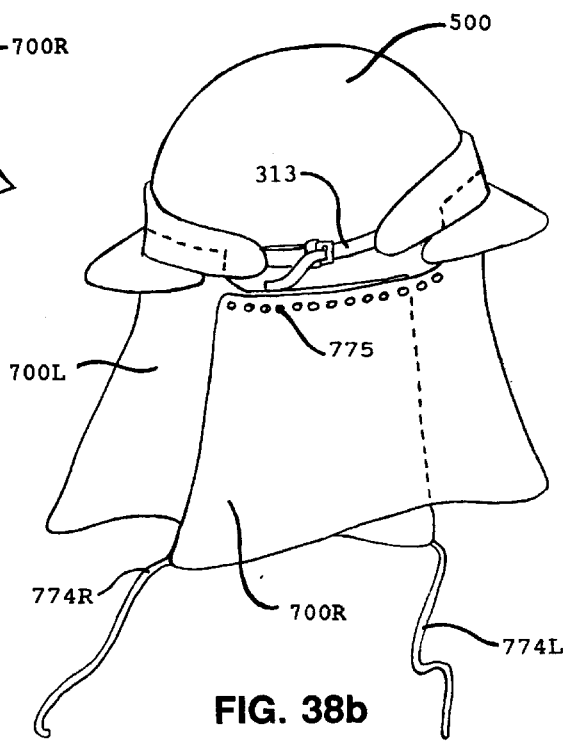

FIGS. 38a and 38b show side flap rear overlap 761 and rear overlap fastening devices 775R, 775L which provide the wearer with a number of closure options. One option is to leave the rear overlap fastening devices 775R and 775L unattached allowing the back of the neck to be exposed, or covered only by headcover 500 if employed (as seen in FIG. 36b). If a minimal closure is desired, rear overlap fastening devices 775R and 775L can be connected only where they crossover as shown in FIG. 38a. For maximal closure, rear overlap fastening devices 775R and 775L are attached along as much of their length as possible creating a seal roughly parallel to headband strap 313 as shown in FIG. 38b. In this position rear overlap 761 creates a two-layer insulated panel over the back of the neck, or a three-layer insulated panel if headcover 500 is also employed.

Figure 39:
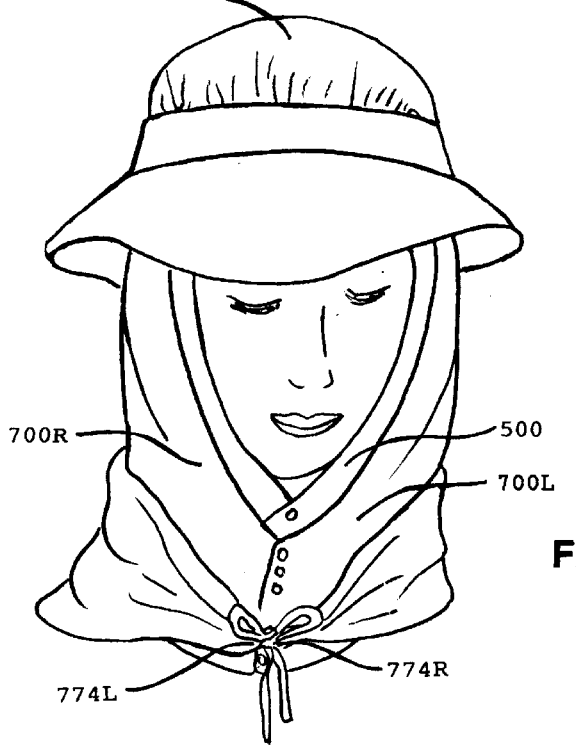
FIG. 39 is a front perspective view of a person wearing the Temperature Regulation Module with the side flaps wrapped around the neck and tied.

FIG. 39 shows headcover 500 worn under side flaps 700R, 700L. Bottom corner fastening devices 774R, 774L are employed to secure side flaps 700R, 700L which are wrapped around the wearer's neck.

FIG. 37 shows headcover 500 worn over side flaps 700R, 700L which provides for additional shade and insulation options.

Side flaps 700 can be utilized without headcover 500, as shown in FIG. 38a, when one is using a kayaking, climbing, or bicycling helmet.

INSECT COVER MODULE

FIGS. 15 through 19b pertain to insect cover module 800 which is designed to protect the wearer's head, neck, face, throat, and upper torso from insects.

FIGS. 16 and 17 show insect cover module 800 equipped with face panel 816, which opens and closes with face panel fastening device 873. Face panel 816 can be opened just enough to pass through a straw or it can be opened all the way and flipped up on top of visor cover 811. Thus, the wearer can eat or drink and still benefit from the protection afforded by the remainder of insect cover module 800. Also, the wearer can lift face panel 816 if it is necessary to see more clearly without looking through the insect-proof material.

Front panel 817 and rear panel 818 meet and can be connected by using front panel fastening devices 871R, 871L and rear panel fastening devices 872R, 872L. When connected, side closures 831R and 831L are created. At any point from insect cover junctures 884R, 884L to the wearer's shoulders, front panel 817 and rear panel 818 can be separated from one another to create an opening through which a strap can pass without jeopardizing the insect-proof seal.

When the two sides of insect cover buckle 814 are connected as shown in FIGS. 15 and 17, a head-encircling member is created by visor cover 811, insect cover straps 813a, 813b, and insect cover buckle 814.

Insect cover straps 813a, 813b and insect cover buckle 814 can be positioned either under rear panel 818 as shown in FIGS. 16 and 19b, or over rear panel 818 as shown in FIGS. 17 and 19a.

To wear insect cover straps 813a, 813b under rear panel 818, as shown in FIGS. 16 and 19b, an opening between front panel 817 and rear panel 818 is created at the very top of side closures 831R, 831L just below insect cover junctures 884R, 884L. This opening is made by creating space between front panel fastening device 871R, 871L and rear panel fastening device 872R, 872L. Insect cover straps 813a, 813b can pass through. Front panel 817 and rear panel 818 are reconnected by attachment of front panel fastening device 871R, 871L to rear panel fastening device 872R, 872L around insect cover strap 813a or 813b. Thus, an insect-proof seal is preserved.

If the wearer has chosen to wear insect cover straps 813a, 813b and insect cover buckle 814 over rear panel 818, as shown in FIGS. 17 and 19a, simply connect insect cover buckle 814 and adjust the fit. When worn in this manner the wearer can pull up on crown panel 819 and it will be held in an elevated position. This feature enables the wearer to regulate the amount of heat retained or ventilated, and to increase or decrease the amount of air space between the head and insect cover module 800.

FIG. 17 shows insect cover module 800 worn with a shoulder strap passing through side closure 831R. To utilize this feature, while insect cover module 800 is on the wearer, starting at the shoulder, open side closure 831R and side closure 831L high enough to put pack with straps on shoulders. Then, place front panel fastening device 871R, 871L over the pack straps. Fasten the remaining length of front panel fastening device 871R, 871L to the remaining length of rear panel fastening device 872R, 872L.

FIG. 16 shows front bottom edge 822 and rear bottom edge 823 held tight against the body by front bottom casing tightening device 874 and rear bottom casing tightening device 875 as seen in FIG. 15. When front underarm fastening devices 876R, 876L and rear underarm fastening devices 877R, 877L are employed and tightened the elasticity provided by front bottom casing tightening device 874 and rear bottom casing tightening device 875 pull front bottom edge 822 and rear bottom edge 823 tightly across the torso to create an insect-proof seal.

RAIN COVER MODULE

FIGS. 20 through 25 pertain to rain cover module 900 which is designed to prevent precipitation and wind from contacting the head, neck, and face of the wearer. Further, rain cover module 900 is designed to present no seams to direct precipitation.

FIG. 20 shows the underside of rain cover module 900. To employ rain cover module 900, attach visor 200 to headband 300 by methods previously explained. Then slip visor 200 between rain cover material piece 911 and rain cover lining 912 where it fits along superior edge 920. Rain cover/visor attachment devices 972R, 972L can be hooked around juncture clefts 281R, 281L (see FIG. 25) to center and secure rain cover module 900.

FIGS. 21a, 21b, and 22 show rain cover module being worn. By crossing vertical neck edge 927R over or under vertical neck edge 927L, as shown in FIG. 21b, rain cover overlap 965 is created. Rain cover overlap 965 provides an area for attachment of rain cover overlap fastening devices 975R, 975L, as shown in FIG. 21a. Rain cover overlap fastening device 975R connects to rain cover overlap fastening device 975L to effect a wind and water-proof seal.

To further guard against wind or water, rain cover module 900 is equipped with rain cover underarm fastening devices 976R, 976L, as shown in FIG. 21a. Rain cover underarm fastening devices 976R, 976L hold rain cover bottom edge 929 flat across the wearer's upper arms. This secures a tent-like shape that shunts water off the wearer's shoulders.

FIG. 23 shows storage bag 914 into which rain cover module 900, insect cover module 800, and the soft components of temperature regulation module 100 can be stuffed to store and transport. To employ storage bag 914, remove rain cover module 900 from head, disconnect visor/rain cover fastening devices 972R, 972L from visor/headband juncture clefts 281R and 281L, unzip storage bag zipper 974, and turn inside out. This puts the remainder of rain cover module 900 inside storage bag 914. The other modules and components can then be added to storage bag 914. Using headband strap 313a, 313b and headband buckle 312a, 312b, visor 200/headband 300 can clip through storage bag loop 977 of storage bag 914. Storage bag 914 can also be hung from a belt or pack by storage bag hook 978.

Using the Modules Together

FIGS. 5a, 5b, 17, 20 and 25 show all-module fastening devices included on the primary modules of the Modular Head Covering System.

FIG. 1 shows the use of the three primary modules together. The wearer first places temperature regulation module 100 on his/her head and adjusts for comfort. Then, depending upon conditions, the wearer can choose to employ one or both of the remaining modules.

If needed, insect cover module 800 is then placed over the head and aligned correctly with visor cover 811 resting upon visor 200. When properly placed, insect cover all-module fastening devices 90bR, 90bL on the inside of insect cover module 800 will line up with and can be secured to temperature regulation all-module fastening devices 90aR, 90aL on temperature regulation module 100.

Rain cover module 900 can be secured to insect cover module 800 or directly to temperature regulation module 100. Rain cover all-module fastening devices 90dR, 90dL can be wrapped around visor 200 (also see FIG. 25) and connected to insect cover all-module fastening devices 90cR, 90cL on insect cover module 800 or directly to temperature regulation all-module fastening devices 90aR, 90aL on temperature regulation module 100.

RAMIFICATIONS, CONCLUSION, AND SCOPE

Accordingly, the reader will see that the modules and components of the Modular Head Covering System function co-operatively in a plurality of possible combinations. In addition, a combination or arrangement of parts is possible to protect the wearer under any conditions normally encountered in the out-of-doors. Further, the reader will see that the temperature regulation module of the Modular Head Covering System provides the wearer with a heretofore unseen degree of sun protection as part of a light-weight, easy to pack and carry, comprehensive head covering system for people living, working, or recreating outdoors.

Although the description above contains many specificities, these should not be construed as limiting the scope of the invention, but as merely providing illustrations of some of the present preferred embodiments of this invention. Many other variations are possible.

For example: All modules and components could provide surfaces for logos, indices, printed messages, or advertisements or could be made of tie-dyed, decorative, patterned, or specialty-printed fabrics for specific events or target markets such as gardeners, golfers or painters.

The temperature regulation module could be constructed of special fabrics for specific conditions such as, for ventilation: cotton, hemp, linen, rayon, for insulation, warmth or wind protection: flannel, silk, down-filled cloth, wool, polar fleece, sheepskin, leather, polypropylene, polyester, or nylon, for protection from water: coated, laminated or treated fabrics, for protection from ultraviolet radiation: fabrics of dense weave, specialty fabrics with sun protection factor ratings, coated or treated ultraviolet radiation blocking fabrics, or any combination of the above textiles.

The headcover could attach to the head-encircling member by any length of attachment from a one-spot attachment such as a button or snap, to an attachment along the entire head-encircling member.

The headcover could be constructed of two or more pieces of fabric joined by seams to create a rounded head-shaped crown and to eliminate the need for gathers along the attachment edge.

The headcover could be constructed with two or more layers of fabric such as flannel covered by polar fleece covered by wind-proof nylon.

These layers could be attached to one another around the entire periphery, or only along the superior edges. Thus, the wearer could position some layers under the head-encircling member and some layers over the head-encircling member. Also, the wearer could employ multiple layers for insulation, particularly if the side flaps were also employed. The side flaps could also be constructed of two or more layers of fabric.

The headcover and side flaps could be made long and cape-like, or with provision for the wearer's arms like a shirt or jacket.

Side flaps could be shaped to accommodate a triangular fastening device as a throat closure mechanism such as is described in the preferred embodiment of the headcover.

Side flaps could be shaped at the back to create a triangular overlap when in the extreme closed position.

The visor could be made of an uncovered stiff material such as plastic or neoprene.

The rain cover module could be constructed with an integral head-encircling member.

The insect cover module and the rain cover module could be made with an integral visor stiffener.

The attachment devices referred to in the specifications could be hook and loop fasteners, zippers, snap tape, snaps, grommets, buttons, or any other suitable fastening devices.

Accordingly, the scope of the invention should be determined not by the embodiments illustrated, but by the appended claims and their legal equivalents.

We claim:

1. An article of apparel made up of components comprising
   (a) a visor of crescent shape
   (b) a head-encircling member of flexible fabric,
   (c) a bell shaped headcover of flexible fabric,
   (d) a pair of side flaps of flexible fabric,
   (e) said visor connecting to said head-encircling member,
   (f) said headcover connecting to said head-encircling member,
   (g) said side flaps connecting to said head-encircling member,
whereby said components used in various combinations provide a wearer with shade, heat retention, ventilation and dust protection.

2. The article of apparel of claim 1 wherein said visor, said headcover, and said side flaps append to said head encircling member.

3. The article of apparel of claim 1 wherein said visor, said head encircling member, said headcover, and said side flaps are detachable from one another.

4. The article of apparel of claim 1 wherein a plurality of pockets are located on said head-encircling member in which said headcover and said side flaps are detachably connected to said head-encircling member.

5. The article of apparel of claim 1 wherein a pair of notches are cut into said headcover at positions designed to correspond approximately to the temples of a wearer, said notches having superior and inferior edges, said superior edges of said notches terminating the connection of said headcover to said head-encircling member, and said inferior edges of said notches being unattached and free to lie on either side of the head-encircling member.

6. The article of apparel of claim 1 wherein said bell-shaped headcover has two side edges which are designed to frame a wearer's face and to cross under a wearer's chin creating an overlap consisting of two areas of overlapped fabric upon each of which is attached one part of a two-part throat closure fastening device, each part of said throat closure fastening device consisting of fastening means secured to each of the two areas of overlapped fabric in the configuration of an equilateral triangle of said fastening means, whereby by attaching one, two or three points of said equilateral triangle of said fastening means, or by rotating one said equilateral triangle of said fastening means as it relates to the other said equilateral triangle of said fastening means, a plurality of closure configurations is possible.

7. The article of apparel of claim 1 wherein said headcover has a pair of side cinch tightening devices located at positions designed to correspond approximately to opposite sides of the nape of the neck of a wearer, said side cinches comprising two straps and an adjustable buckle which, when tightened, gather excess fabric at the neck of a wearer to hold in body heat and to reduce drafts.

8. The article of apparel of claim 1 wherein said side flaps are designed to cross at the back of a wearer's head creating an overlap consisting of two areas of overlapped fabric upon each of which is attached one part of a two-part fastening means, said two parts of said fastening means being attachable to one another at any point along the length of said fastening means, even to the extreme of being attached to one another across the entire length of said fastening means thus creating a double-insulated area across the back of a wearer's head.

9. The article of apparel of claim 1 wherein said head-encircling member has one or more fastening means designed to fasten to said side flaps and said side flaps each has a fastening means designed to fasten to said head encircling member, said fastening means of said side flaps being shorter in length than said fastening means of said head-encircling member, whereby said side flaps can be fastened to said head-encircling member at any point along the length of said fastening means of said head encircling member.

* * * * *